US011381787B2

(12) United States Patent
Nakatani et al.

(10) Patent No.: US 11,381,787 B2
(45) Date of Patent: Jul. 5, 2022

(54) IMAGE CAPTURING APPARATUS, METHOD FOR CONTROLLING SAME, AND NON-TRANSITORY COMPUTER-READABLE STORAGE MEDIUM

(71) Applicant: CANON KABUSHIKI KAISHA, Tokyo (JP)

(72) Inventors: Yu Nakatani, Chiba (JP); Takamichi Kosugi, Tokyo (JP); Tokuro Nishida, Kanagawa (JP); Kazuya Kitamura, Kanagawa (JP); Tadanori Saito, Tokyo (JP); Koji Ogaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/193,759

(22) Filed: Mar. 5, 2021

(65) Prior Publication Data

US 2021/0281805 A1 Sep. 9, 2021

(30) Foreign Application Priority Data

Mar. 9, 2020 (JP) .............................. JP2020-039921
Mar. 9, 2020 (JP) .............................. JP2020-039922

(51) Int. Cl.
*H04N 7/54* (2006.01)
*H04N 7/24* (2011.01)

(52) U.S. Cl.
CPC ......... *H04N 7/54* (2013.01); *H04N 2007/243* (2013.01)

(58) Field of Classification Search
CPC ........................... H04N 7/54; H04N 2007/243
See application file for complete search history.

(56) References Cited

U.S. PATENT DOCUMENTS 5,740,161 A * 4/1998 Porter ................. H04L 12/1813
348/14.08
2010/0115047 A1* 5/2010 Briscoe .................. H04N 5/073
709/208
2017/0105054 A1* 4/2017 Bannister ............. H04N 21/262

FOREIGN PATENT DOCUMENTS

JP 2009-100315 A 5/2009
JP 2012-253599 A 12/2012

* cited by examiner

*Primary Examiner* — Michael E Teitelbaum
(74) *Attorney, Agent, or Firm* — Cowan, Liebowitz & Latman, P.C.

(57) ABSTRACT

The invention provides an image capturing apparatus including a terminal for input from an external device of a timecode signal synchronized with video frames, where the apparatus comprises a first synchronizing unit which executes synchronization with a timecode superimposed on the timecode signal input into the terminal, a second synchronizing unit which executes synchronization with horizontal and vertical synchronizing phases of the timecode signal and executes synchronization with the timecode superimposed on the timecode signal, and a control unit which executes synchronization processing by the first synchronizing unit or the second synchronizing unit in a case where a timecode signal input into the terminal is detected.

18 Claims, 21 Drawing Sheets

FIG. 6

| BIT NUMBER | CONTENT |
|---|---|
| 0~3 | FRAME (ONES PLACE) |
| 4~7 | USER BIT AREA 1 |
| 8~9 | FRAME (TENS PLACE) |
| 10~11 | FLAG |
| 12~15 | USER BIT AREA 2 |
| 16~19 | SECOND (ONES PLACE) |
| 20~23 | USER BIT AREA 3 |
| 24~26 | SECOND (TENS PLACE) |
| 27 | FLAG |
| 28~31 | USER BIT AREA 4 |
| 32~35 | MINUTE (ONES PLACE) |
| 36~39 | USER BIT AREA 5 |
| 40~42 | MINUTE (TENS PLACE) |
| 43 | FLAG |
| 44~47 | USER BIT AREA 6 |
| 48~51 | HOUR (ONES PLACE) |
| 52~55 | USER BIT AREA 7 |
| 56~57 | HOUR (TENS PLACE) |
| 58~59 | FLAG |
| 60~63 | USER BIT AREA 8 |
| 64~79 | SYNC WORD |

F I G. 16A
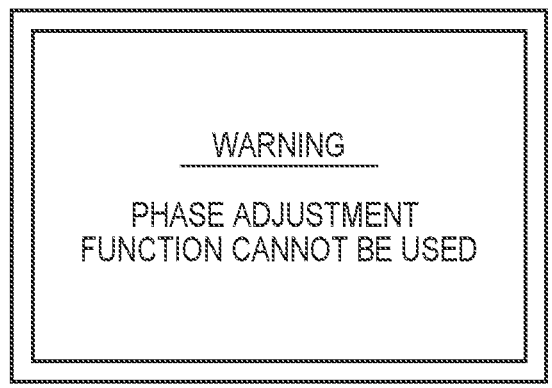
F I G. 16B
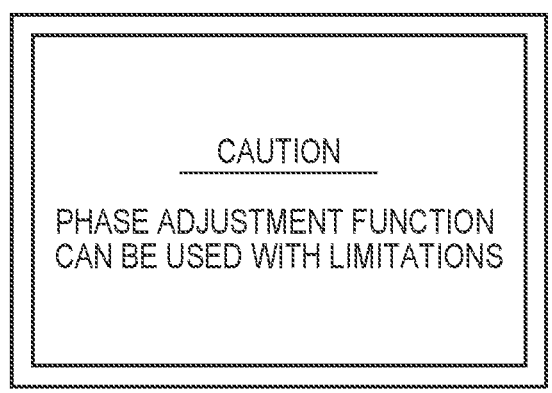
F I G. 16C
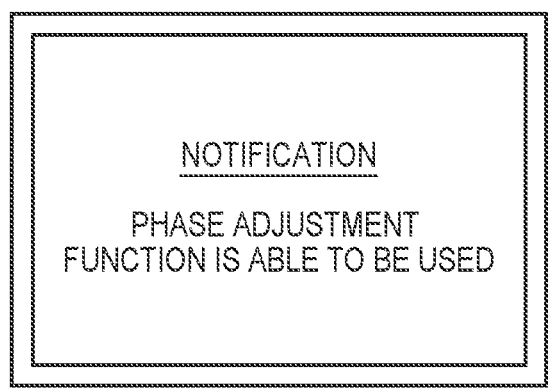

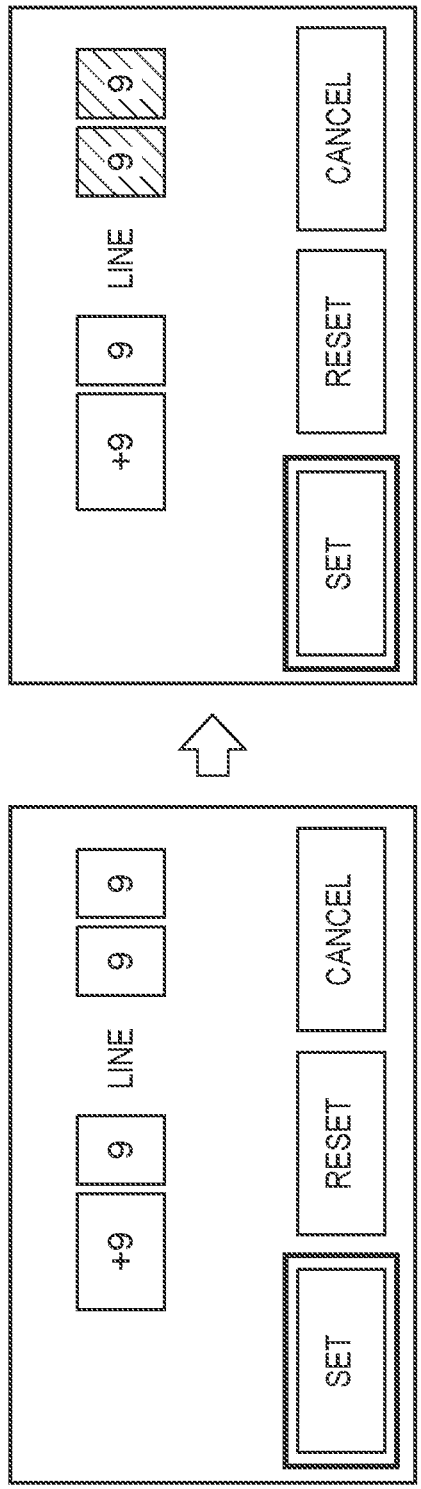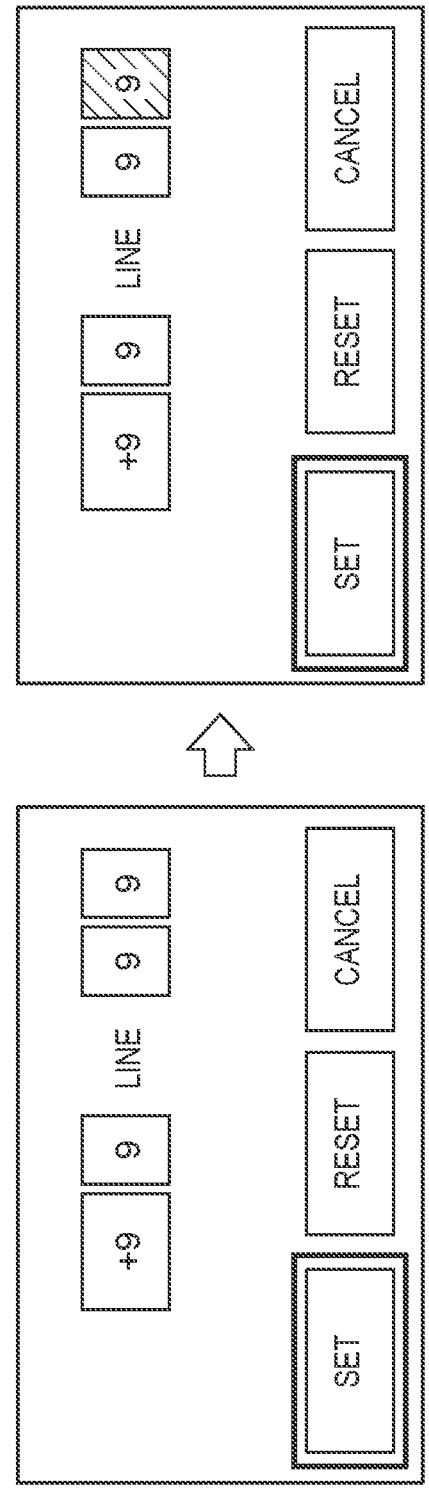

IMAGE CAPTURING APPARATUS, METHOD FOR CONTROLLING SAME, AND NON-TRANSITORY COMPUTER-READABLE STORAGE MEDIUM

BACKGROUND OF THE INVENTION

Field of the Invention

The present invention relates to an image capturing apparatus, a method for controlling the same, and a non-transitory computer-readable storage medium.

Description of the Related Art

When video captured from a plurality of video cameras is edited, the video signals and the timecodes are synchronized (genlocked) before editing is performed. Typically, to synchronize video signals from video cameras, a dedicated synchronizing signal (hereinafter referred to as a GL signal), such as a tri-level synchronizing signal and a black burst signal, is input, and to synchronize timecodes, a timecode signal (hereinafter referred to as a TC signal) in accordance with the standard defined in ST 12 by the Society of Motion Picture and Television Engineers (SMPTE) is input. This means that two cables, one for a GL signal and one for a TC signal, need to be connected. In the related art, technology for executing synchronization processing using a reference synchronizing signal is known. One such example is Japanese Patent Laid-Open No. 2009-100315. This technology relates to executing processing to synchronize the intra-system signals when a reference synchronizing signal source is input into a video input terminal.

Video cameras that synchronize video signals using a TC signal have been developed in recent years. A synchronization process using a TC signal makes it possible to execute both the synchronization processing for the video signals and the synchronization processing for the timecodes using a single cable. This is advantageous in that connection during installation is made easy.

However, a video apparatus that executes synchronization of video signals and synchronization of timecodes using a TC signal has problems in that the video apparatus cannot determine the control desired by the user. Both synchronization timing and a timecode are extracted from the TC signal. Thus, by simply connecting a TC signal to a video apparatus, whether the user wants to synchronize the video signals, synchronize the timecodes, or both cannot be determined. Thus, operations not desired by the user or unnecessary processing may be executed.

Furthermore, in a case of executing synchronization of video signals using TC signals standardized by the Society of Motion Picture and Television Engineers (SMPTE), because the standards are lax, depending on the input waveform, the time taken may be more than when executing synchronization of video signals using a GL signal.

Also, a known video camera that executes synchronization processing using a GL signal has a function whereby the user finely adjusts the phase between the signal source of the GL signal and the video camera. Specifically, for example, when the user sets the phase adjustment via a menu displayed by the video camera, the clock frequency in the video camera is controlled according to the setting value and phase adjustment is executed.

Technology is also known for simplifying connection during installation by transmitting a GL signal and a TC signal using a single cable. One such example is Japanese Patent Laid-Open No. 2012-253599. However, this technology is limited in its application due to a dedicated cable being required.

In light of this, a video camera that synchronizes video signals using a TC signal have been developed in recent years is conceivable. A synchronization process using a TC signal makes it possible to execute both the synchronization processing for the video signals and the synchronization processing for the timecodes using a single cable, making connection during image capture and installation easy.

However, because the standards relating to frame switch timing of TC signals are lax compared to that of GL signals, with the adjustment range of known phase adjustment functions for GL signals, the user may not be able to adjust the phase all the way to the desired phase. Also, when executing phase adjustment, by just controlling the clock frequency in the video camera, adjusting the phase to the desired phase may take a long time.

SUMMARY OF THE INVENTION

The present invention has been made in light on the problems described above and is directed at providing technology the enables a user to select the desired synchronization processing when video signal synchronization using a TC signal is executed.

According to an aspect of the invention, there is provided an image capturing apparatus including a terminal for input from an external device of a timecode signal synchronized with video frames, comprising: a first synchronizing unit configured to execute synchronization with a timecode superimposed on the timecode signal input into the terminal; a second synchronizing unit configured to execute synchronization with horizontal and vertical synchronizing phases of the timecode signal and execute synchronization with the timecode superimposed on the timecode signal; and a control unit configured to execute synchronization processing by the first synchronizing unit or the second synchronizing unit in a case where a timecode signal input into the terminal is detected.

Also, another aspect of the present invention is directed at providing technology that enables the user to align the phases of a signal source of a TC signal and an image capturing apparatus to a desired phase and help prevent a long time being taken for adjustment.

According to the present invention, synchronization processing intended by the user can be executed.

According to another aspect of the present invention, the user can align the phases of a signal source of a TC signal and a video camera to a desired phase and help prevent a long time being taken for adjustment.

Further features of the present invention will become apparent from the following description of exemplary embodiments (with reference to the attached drawings).

BRIEF DESCRIPTION OF THE DRAWINGS

FIG. 6 is a diagram illustrating the contents of each bit of a TC signal.

FIGS. 16A to 16C are diagrams illustrating examples of information display screens according to the fourth embodiment.

FIGS. 17A to 17D are diagrams illustrating examples of phase adjustment menu screens according to the fourth embodiment.

DESCRIPTION OF THE EMBODIMENTS

Figure 1:
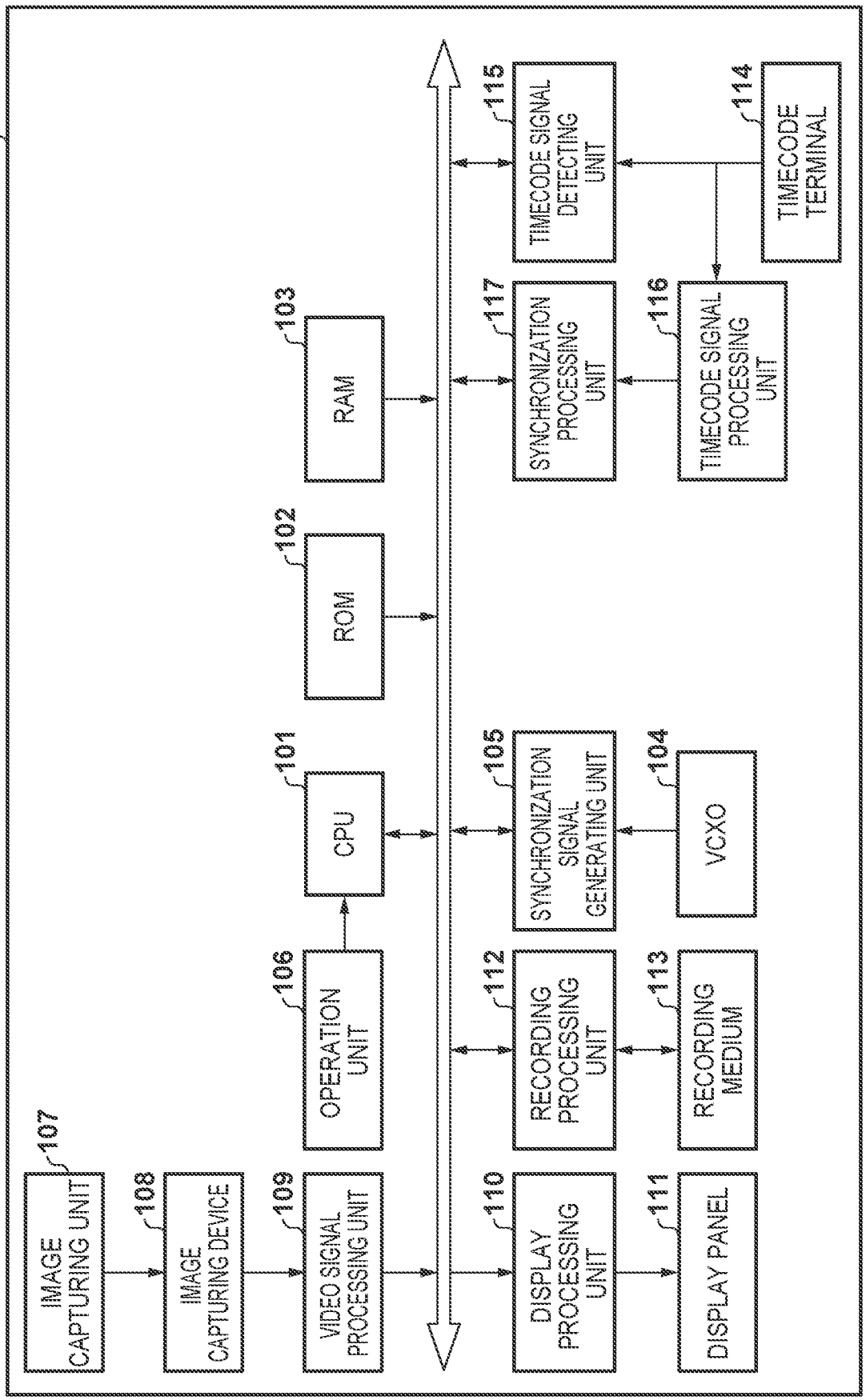
FIG. 1 is a block configuration diagram of an image capturing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block configuration diagram of an image capturing apparatus 100 represented by a video camera. The image capturing apparatus 100 includes a timecode terminal 114 where a synchronizing timecode signal (hereinafter referred to as a TC signal) is input from the outside into the video frames.

A CPU 101 executes various control and processing by executing a control program stored in ROM 102. The ROM 102 can store programs as well as display data and the like. RAM 103 is used in storing data when the CPU 101 executes a program. Also, the RAM 103 is used to temporarily store captured video data.

The CPU 101 receives an instruction operation from the user via an operation unit 106 and sends instructions based on the operation to the other units. For example, the CPU 101 can start or stop recording by sending an instruction to a recording processing unit 112. Also, in a case where a menu operation is received from the user, the CPU 101 reads display data from the ROM 102 and sends this data to a display processing unit 110 so that the menu is displayed on a display panel 111.

A synchronization signal generating unit 105 generates a video horizontal synchronizing signal and a video vertical synchronizing signal based on a clock from a voltage controlled crystal oscillator (VCXO) 104 and supplies the signals to the other units. The horizontal synchronizing signal and the vertical synchronizing signal are synchronized, then image capture and display (output) are executed.

An image capturing unit 107 includes optical units, such as a focus lens, a zoom lens, a diaphragm, a shutter, and the like and executes optical processing appropriate to the optical image entered from the outside and forms an image on an image capturing device 108.

The image capturing device 108 executes processing to convert the optical image formed on the surface into an electrical signal and sends the converted electrical signal to a video signal processing unit 109. The image capturing device 108 typically includes an image sensor, such as a CCD sensor, a CMOS sensor, or the like.

The video signal processing unit 109 executes image processing, such as A/D conversion processing or amplification processing, on the electrical signal obtained from the image capturing device 108 and generates video data. The video data may be stored in the RAM 103 as appropriate, or may be sent to the display processing unit 110 or the recording processing unit 112 without going through the RAM 103.

The display processing unit 110 combines the video data generated by the video signal processing unit 109, the video data reproduced by the recording processing unit 112, the display data from the CPU 101, and the like, and outputs this composite data as a video signal to the display panel 111.

The display panel 111 displays the video signal from the display processing unit 110. Also, the display panel 111 may be a unit separate from the video camera, such as an external monitor, for example.

The recording processing unit 112 has a function of compressing (encoding) and expanding (decoding) the video signal and encodes the video signal generated by the video signal processing unit 109 and records the encoded video signal as a video file in a recording medium 113. The encoding method is, for example, MPEG-2 (developed by the Moving Picture Experts Group (MPEG)) H.264, H.265, or the like. Also, when an instruction is received to reproduce the video file from the CPU 101, the recording processing unit 112 reads the desired video file from the recording medium 113 and decodes and generates the video file as video data.

The recording medium 113 is, for example, a recording medium that allows for random access such as a flash memory card. The recording medium 113 is detachably attached to the image capturing apparatus 100 via an insertion and ejection mechanism (not illustrated). Also, the CPU 101 manages the various data to be recorded in the recording medium 113 as files in accordance with a known file system such as a file allocation table (FAT) file system.

The CPU 101 also generates a timecode. Typically, a timecode includes hours, minutes, seconds, frames, field bits, and user bits. The CPU 101 stores the current timecode in the RAM 103 and, when video data is generated at the video signal processing unit 109, assigns a timecode to the video data. Then, the stored timecode is advanced. The timecode assigned to the video data is displayed superimposed on the video data by the display processing unit 110 and recorded in the video data and the video file at the recording processing unit 112. When the timecode is changed via a menu operation or the like, the CPU 101 overwrites the stored timecode with this value. Also, when a TC signal is input to the timecode terminal 114 from an external device (for example, another image capturing apparatus), the timecode stored by the RAM 103 can be synchronized.

A timecode signal detecting unit 115 detects whether or not a TC signal has been input into the timecode terminal 114 from an external device. The CPU 101 can learn of the external TC signal input state by querying the timecode signal detecting unit 115. When an external TC signal is detected, the CPU 101 instructs a synchronization processing unit 117 to start synchronization processing using the TC signal.

A timecode signal processing unit 116 extracts a timecode from the TC signal input into the timecode terminal 114 from an external device and notifies the CPU 101. The timecode is updated each frame. Thus, the CPU 101 can obtain the timecode of each frame, verify whether or not the timecode is correct, and, in a case where the timecode is correct, overwrite the timecode stored in the RAM 103 with this value.

Furthermore, the timecode signal processing unit 116 executes waveform measurement per 1 bit of the input TC signal. In the waveform measurement, any one of the rise time, the fall time, the high time, and the low time of the waveform are measured, and a signal able to be used in synchronization processing is selected. The timecode signal processing unit 116 extracts the video horizontal synchronizing signal and the video vertical synchronizing signal from the selected signal and sends them to the synchronization processing unit 117. The waveform measurement items described here are examples, and the timecode signal processing unit 116 is capable of various waveform measurements.

When the synchronization processing unit 117 receives an instruction to start synchronization processing from the CPU 101, the synchronization processing unit 117 executes phase locked loop (PLL) control on the VCXO 104 to remove a phase difference between the horizontal synchronizing signal from the synchronization signal generating unit 105 and the horizontal synchronizing signal from the timecode signal processing unit 116. Also, when the phase difference between the horizontal synchronizing signal generated by the synchronization signal generating unit 105 and the horizontal synchronizing signal from the timecode signal processing unit 116 is within a predetermined range, the synchronization processing unit 117 notifies the CPU 101 that horizontal synchronization is complete.

Next, the CPU 101 queries the synchronization processing unit 117 requesting the phase difference between the vertical synchronizing signal from the synchronization signal generating unit 105 and the vertical synchronizing signal obtained from the TC signal from the external device via the timecode signal processing unit 116. Then, the CPU 101 notifies the synchronization signal generating unit 105 of the phase difference obtained via the query. By the synchronization signal generating unit 105 changing the output timing of the vertical synchronizing signal by an amount equivalent to the notified phase difference, the phase difference of the vertical synchronizing signal can be set within a predetermined range.

Also, in a case where the phase of the horizontal synchronizing signal of the input TC signal fluctuates, the synchronization processing unit 117 can continuously execute PLL control on the VCXO 104 to bring them in sync. In a case where the phase of the vertical synchronizing signal fluctuates, the synchronization processing unit 117 notifies that CPU 101 of the desynchronization. The CPU 101 notifies the synchronization signal generating unit 105 of the phase difference and the output timing of the vertical synchronizing signal is adjusted again to bring them in sync.

Also, the synchronization processing unit 117 has a jam sync mode. In a case where the TC signal from an external device is failed to be detected due to a cable being pulled out from the timecode terminal 114 or the like, the timecode signal detecting unit 115 notifies the CPU 101 of the TC signal non-detection. When the CPU 101 receives this notification, the CPU 101 instructs the synchronization processing unit 117 to transition to jam sync mode. In jam sync mode, the synchronization processing unit 117 executes PLL control on the VCXO 104 to maintain the state of just before the cable was pulled out. Furthermore, even in a case where the power is turned off and then back on, the synchronization processing unit 117 maintains the jam sync state of before the power was turned off. For example, a method is conceivable that uses as a reference a real-time clock or similar clock (with frequency equal to or less than the frame rate) that continuously operates even when the camera is powered off and stores the phase difference between the dock and the horizontal/vertical synchronizing signals so that when the power is turned on, the phase difference can be restored.

Figure 3A:
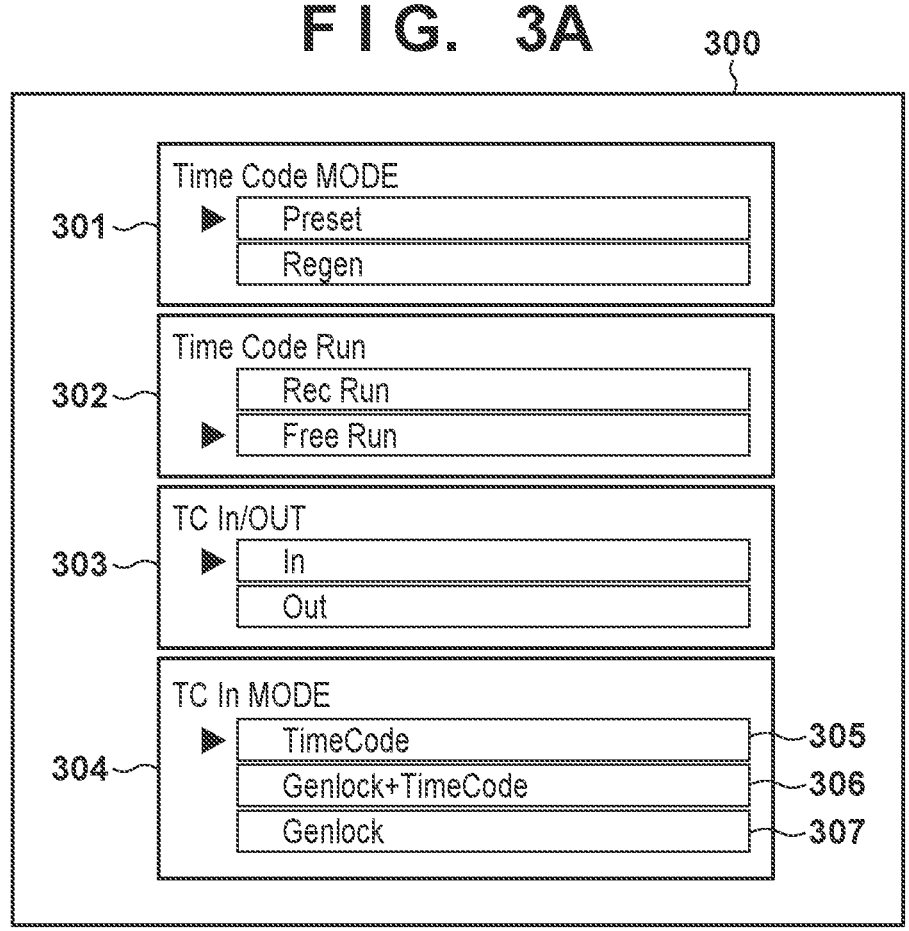
FIGS. 3A and 3B are diagrams illustrating examples of displays of an image capturing apparatus.

FIG. 3A is a menu screen 300 for selecting the processing to be executed on the TC signal input to the timecode terminal 114. The menu screen 300 is displayed on the display panel 111 by control via the CPU 101. In the present embodiment, the menu screen 300 can be displayed by selecting timecode settings from the settings screen of the image capturing apparatus 100. However, in another embodiment, when a timecode signal is detected, the menu screen 300 is displayed and, when the user selects an item from the submenu and confirms the selection, processing is executed according to the setting selected by the user.

In the diagram, a reference sign 301 denotes a submenu for selecting the Timecode Mode (advancement mode), and a reference sign 302 denotes a submenu for selecting the Timecode Run (advancement method).

When "Preset" is selected for the Timecode Mode and "Rec Run" is selected for the Timecode Run, control is executed to advance the timecode only when recording, and the starting timecode can be set to a discretionary value (Preset value). Next, when "Preset" is selected for the Timecode Mode and "Free Run" is selected for the Timecode Run, the timecode advances at all times regardless of the recording state. When "Regen" is selected for the Timecode Mode, the timecode of the final frame of the video data last recorded by the recording medium 113 is read out, and the starting timecode is set to the next value. Typically, when "Regen" is set, "Rec Run" is also forcibly set. In another plausible example, when "Free Run" is set, the user may be restricted from selected "Regen", for example. Selecting "Regen" means that the timecode assigned (added) to video data recorded on the same medium can be continued.

A reference sign 303 denotes a submenu for selecting the timecode input/output. In the present embodiment, this is set to "In" (input). However, by setting this to the TC out mode, a TC signal with the timecode stored in the RAM 103 superimposed thereon can be output.

A reference sign 304 denotes a submenu for selecting the synchronization processing to be executed on the input TC signal. When an item "Timecode" 305 is selected, only the timecode is taken from the TC signal. In other words, only the timecodes are synchronized. When an item "Genlock+Timecode" 306 is selected, synchronization processing of the video signal is executed using the TC signal and the timecode is also taken from the TC signal. In other words, genlocking is executed using a TC signal that also synchronizes to horizontal/vertical synchronizing phases of the TC signal and the timecodes are also synchronized. Also, when an item "Genlock" 307 is selected, only synchronization processing of the video signal using the TC signal is executed. In other words, genlock is executed via a TC signal that also synchronizes to horizontal/vertical synchronizing phases of the TC signal and the timecodes are not synchronized.

According to the configuration described above, the horizontal synchronizing signal and the vertical synchronizing signal in the video camera can be synchronized with the TC signal. Here, the CPU 101 may display on the display processing unit 110 an icon indicating that synchronization processing is in progress and an icon indicating that synchronization processing is complete.

Figure 4:
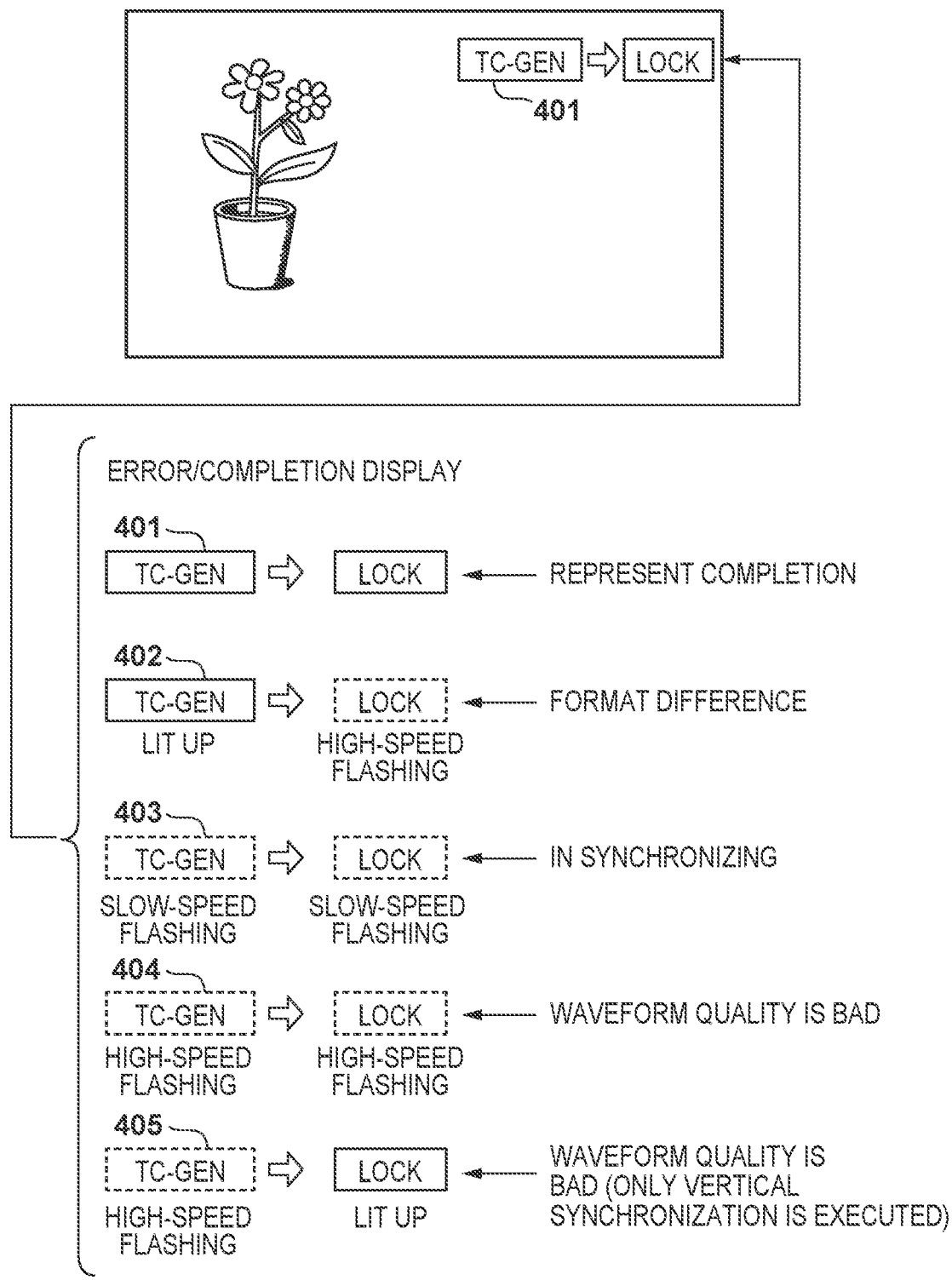
FIG. 4 is a display illustrating an example of operation state displays of an image capturing apparatus.

FIG. 4 illustrates an example of a display on the display screen of the display panel 111 during live view or during recording. An icon 401 in the top-right of the display panel 111 indicates that synchronization processing using the TC signal input from outside is being executed. The icon 401 naturally allows the user to know that processing to synchronize the video signal to the TC signal is being executed, as well as allowing the user to know that the current state is a TC signal synchronized state.

Icons 402 to 405 represent the icon 401 with a portion thereof in a flashing state. Also, the same flashing can be used to divide the flashing state into high-speed flashing and slow-speed flashing. This increases the number of states able to be represented and allows the user to be notified of detailed states.

For example, in a case where the frame rate of the TC signal is different from the frame rate of the image capturing apparatus 100 or other cases where the synchronization processing cannot be executed due to the different format of the TC signal, the LOCK icon represented by the icon 402 can be flashed at a high speed. In a case where synchronization processing has started but the phase difference is not within a predetermined value range, the TC-GEN icon and the LOCK icon represented by the icon 403 are flashed at a slow speed. Also, in a case described below where the waveform of the TC signal is bad, the TC-GEN icon represented by the icons 404, 405 may be flashed at a high speed, for example. In other examples, instead of flashing, a combination of changes in the size and color of the icon can be used to notify the user of the operation state. The difference between the icon 404 and the icon 405 is that the icon 404 indicates that the waveform state of the TC signal is bad and that both vertical or horizontal synchronization has not been executed and the icon 405 indicates that only vertical synchronization has been executed.

Figure 2A:
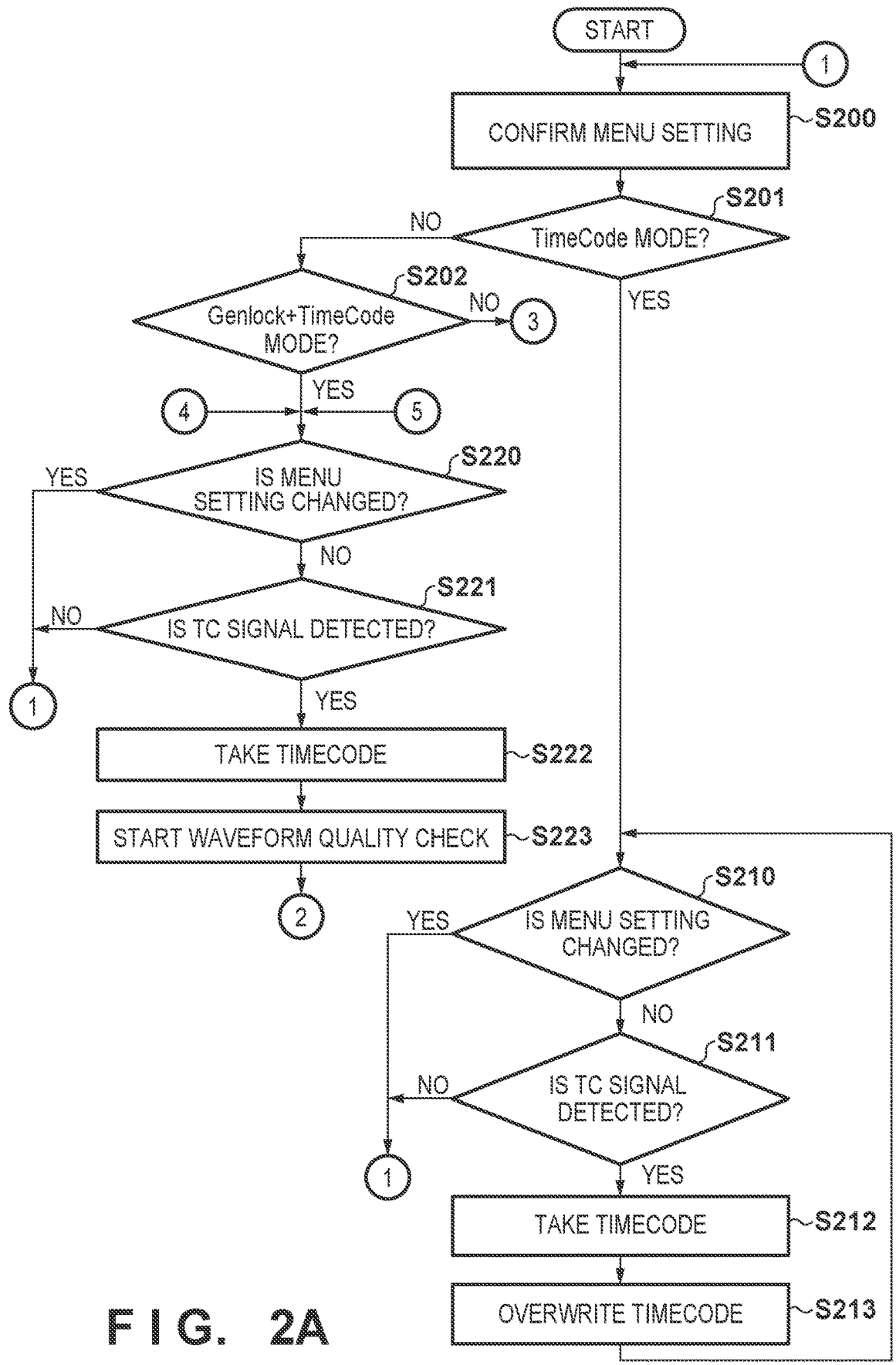
FIG. 2A is a flowchart illustrating a control process executed by a CPU of an image capturing apparatus.
Figure 2B:
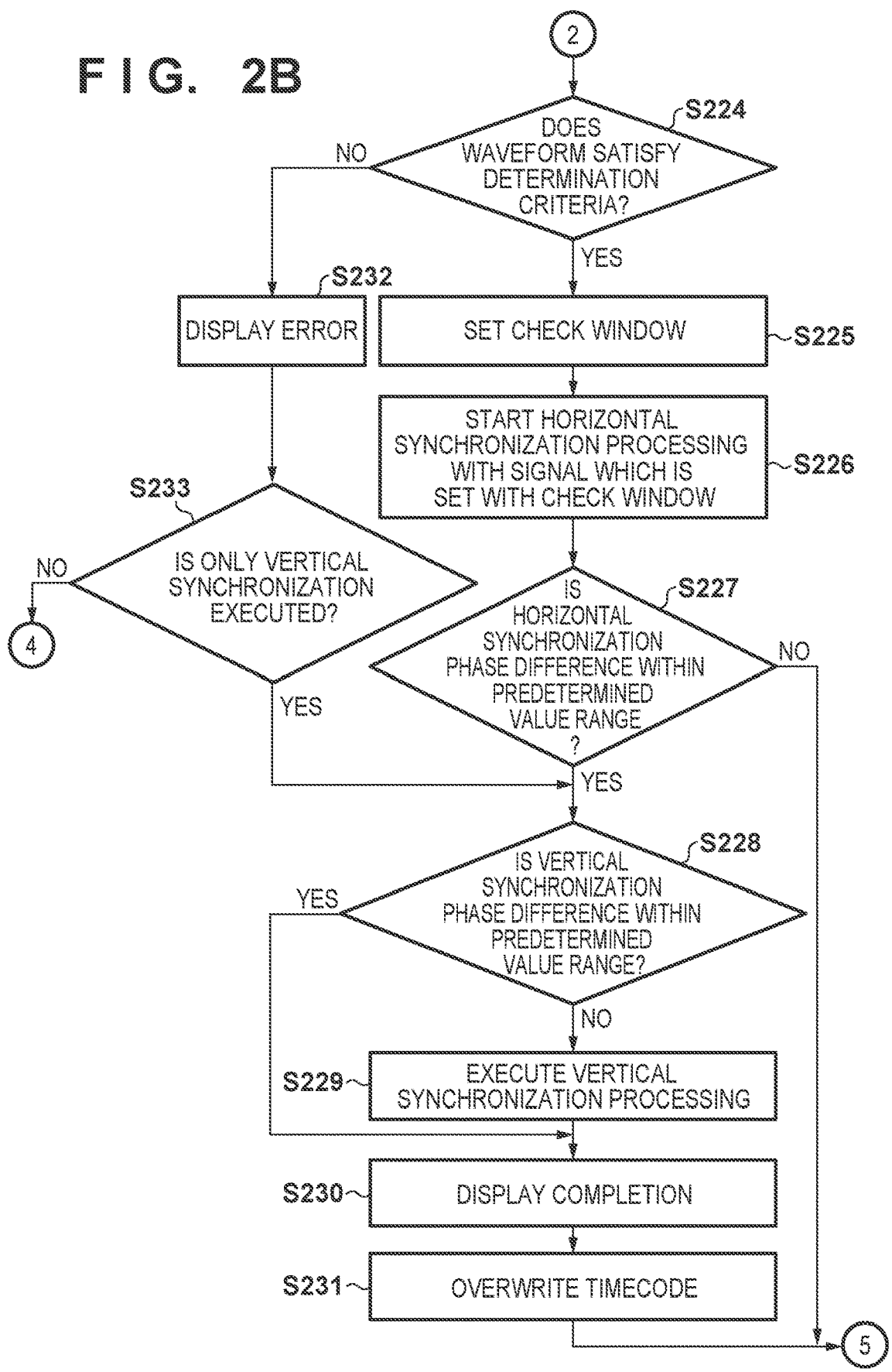
FIG. 2B is a flowchart illustrating a control process executed by a CPU of an image capturing apparatus.

Next, synchronization control processing by the CPU 101 of the image capturing apparatus 100 according to the present embodiment when a signal cable is connected to the timecode terminal 114 will be described with reference to the flowchart of FIGS. 2A to 2C. The trigger to start the processing is the CPU 101 receiving a signal indicating "detection" from a sensor that detects connection of a cable to the timecode terminal 114. Also, the trigger may be the CPU 101 receiving a signal from a timecode signal detecting unit 115 indicating detection of a TC signal.

In step S200, the CPU 101 executes control processing regarding the selected items from the submenus 301 to 304. In the example described below, the submenu 301 is "Preset", the submenu 302 is "Freerun", and the submenu 303 is "In".

In step S201, the CPU 101 determines whether the selected item of the submenu 304 is "Timecode" mode. In a case where the CPU 101 determines that "Timecode" mode is set, the processing proceeds to step S210, and in a case where the CPU 101 determines that it is not set, the processing proceeds to step S202.

Next, in step S202, the CPU 101 determines whether the selected item of the submenu 304 is the "Genlock+Timecode" mode. In a case where the CPU 101 determines that "Genlock+Timecode" mode is set, the processing proceeds to step S220 of FIG. 2B, and in a case where the CPU 101 determines that it is not set (the "Genlock" mode is set"), the processing proceeds to step S240 of FIG. 2C.

First, a case where the "Timecode" mode is set for the submenu 304 will be described. In step S210, the CPU 101 confirms whether the settings content of the submenu 304 has been changed. In a case where the CPU 101 determines that there has been a change, the processing returns to step S200, and in a case where the CPU 101 determines that there is no change, the processing proceeds to step S211.

In step S211, the CPU 101 determines whether or not a TC signal has been input from outside. In a case where the CPU 101 determines that there has been an input, the processing proceeds to step S212, and in a case where the CPU 101 determines that there has been no input, jam sync mode is engaged and the processing returns to step S200.

In step S212, the CPU 101 takes the timecode superimposed on the TC signal. At this time, the timecode stored in the RAM 103 is not overwritten, and the timecode is just temporarily stored. The timecode may be temporarily stored in the same RAM 103, for example. Next, the CPU 101 proceeds the processing to step S213. In step S213, the CPU 101 overwrites the timecode stored in the RAM 103 with the timecode taken in step S212. Then, the processing returns to step S210, and the CPU 101 repeats the processing described above, in a case where the submenu 304 is set as "Timecode" mode, in step S212, the timecode is taken, and in step S213, processing to overwrite the timecode is executed. In this manner, timecode synchronization is executed. Also, only timecode synchronization is executed, and genlock using the TC signal is not executed.

Next, the processing in a case where the "Genlock Timecode" mode is set for the submenu 304 will be described with reference to FIG. 2B.

In step S220, the CPU 101 confirms whether the settings content of the submenu 304 has been changed. In a case where the CPU 101 determines that the settings of submenu 304 have been changed, jam sync mode is engaged and the processing returns to step S200. Also, in a case where the CPU 101 determines that the settings of submenu 304 have not been changed, the processing proceeds to step S221. In step S221, the CPU 101 determines whether or not a TC signal has been input from outside. In a case where the CPU 101 determines that there has been an input, the processing proceeds to step S222, and in a case where the CPU 101 determines that there has been no input, jam sync mode is engaged and the processing returns to step S200.

In step S222, the CPU 101 takes the timecode superimposed on the TC signal. At this time, the timecode stored in the RAM 103 is not overwritten, and the timecode is just temporarily stored. The timecode may be temporarily stored in the same RAM 103, for example. Next, the CPU 101 proceeds the processing to step S213.

In step S223, the CPU 101 starts a waveform quality check of the input TC signal and executes waveform measurement.

The waveform quality check is processing executed by the timecode signal processing unit 116. First, the timecode signal processing unit 116 executes waveform measurement per 1 bit of the input TC signal. An example of the waveform measurement is given below. Any one of the rise time, the fall time, the high time, and the low time of the waveform are measured, and a signal able to be used in synchronization processing is selected. For example, the rise time standard of the timecode signal of 400 μs±10 μs is a slower signal compared to the rise time standard of the GL signal of the apparatus of 54 ns. Executing synchronization processing with a signal with a slow rise time causes errors and variations in the synchronization accuracy. Thus, waveform measurement must be performed to select a signal. The waveform measurement described here is an example, and the timecode signal processing unit 116 may be configured to execute various measures relating to waveforms. Also, in the example described above, waveform measurement per 1 bit is executed. However, a plurality of bits may be obtained by the RAM 103 and measured.

In step S224, the CPU 101 determines whether the waveform measured in step S223 satisfies the conditions of a reference waveform able to be used in synchronization processing. In a case where the CPU 101 determines that the waveform satisfies the conditions of a reference waveform, the processing proceeds to step S225, and in a case where the CPU 101 determines that the waveform does not satisfy the conditions, the processing proceeds to step S232.

In step S225, the CPU 101 marks the waveform satisfying the criteria for being able to be used in synchronization processing with a check WINDOW. Then, in step S226, the CPU 101 instructs the synchronization processing unit 117 to start horizontal synchronization processing and executes synchronization processing with the horizontal synchronizing signal described above using the waveform marked with the check WINDOW.

In step S227, the CPU 101 calculates the phase difference between the horizontal synchronizing signal extracted from the TC signal marked with the check WINDOW and the horizontal synchronizing signal generated in the image capturing apparatus 100 and determines whether or not the calculated phase difference is within a predetermined value range. In a case Where the CPU 101 determines that the phase difference is within the predetermined value range, the processing proceeds to step S228. In a case where the CPU 101 determines that the phase difference is not within the predetermined value range, the processing returns to step S220, and the processing loops until the phase difference is within the predetermined value range. Here, during the synchronization processing of the video signal using the TC signal, the CPU 101 notifies the user that the phase difference is not within the predetermined value range. For example, the CPU 101 displays on the display panel 111 the icon 403 (the TC-GEN icon and the LOCK icon in a slow-speed flashing state) and notifies the user that synchronization is still in progress.

In step S228, the CPU 101 calculates the phase difference between the vertical synchronizing signal extracted from the TC signal marked with the check WINDOW and the vertical synchronizing signal generated in the image capturing apparatus 100 and determines whether or not the calculated phase difference is within a predetermined value range. In a case where the CPU 101 determines that the calculated phase difference is within the predetermined value range, the processing proceeds to step S230, and otherwise the processing proceeds to step S229.

In step S229, the CPU 101 adjusts the output timing of the vertical synchronizing signal by an amount equivalent to the phase difference as described above to synchronize the vertical synchronizing signal.

In step S230, the CPU 101 notifies the user that the synchronization processing of the video signal using the TC signal has completed. For example, the CPU 101 displays the icon 401 (the TC-GEN icon and the LOCK icon in a lit up state) of FIG. 4 to notify the user that synchronization has completed. Next, the CPU 101 proceeds the processing to step S231.

In step S231, the CPU 101 overwrites the timecode stored in the RAM 103 with the timecode taken in step S222. Then, the CPU 101 returns the processing to step S220, and the processing described above is looped. In a case where the submenu 304 is set as "Genlock+Timecode" mode, in step S222, the timecode is taken, and in step S231, processing to overwrite the timecode is executed. In this manner, timecode synchronization is executed. Then, genlock using the TC signal is executed.

Next, a case where, in step S224, it is determined that the conditions of the reference waveform able to be used in synchronization processing are not met will be described. In this case, in step S232, the CPU 101 notifies the user that synchronization processing cannot be executed due to the waveform not satisfying the criteria for being able to be used in synchronization processing. For example, the CPU 101 displays the icon 404 (the TC-GEN icon and the LOCK icon in a high-speed flashing state) of FIG. 4 to notify the user of the error state. Then, in step S233, the CPU 101 determines whether to execute only phase alignment of the vertical synchronizing signal. For example, in a case where the number of times, in step S224, that there is no waveform able to be used in the synchronization processing has been determined has not reached a predetermined number of times, the processing proceeds to step S228. In other words, until the state in which, in step S224, there is no waveform able to be used in the synchronization processing continues for a predetermined amount of time, the processing proceeds to step S228. Then, in a case where the state in which, in step S224, there is no waveform able to be used in the synchronization processing has continued for the predetermined amount of time, the CPU 101 returns the processing to step S220.

Step S228 to step S231 are the same in the case where the waveform satisfies the criteria, however in step S230, in the completion display, the user may be notified that the waveform of the TC signal does not satisfy the criteria. For example, the TC-GEN icon may be flashed at a high-speed and the LOCK icon may be lit up as in the icon 405 of FIG. 4 to indicate the error state.

Figure 2C:
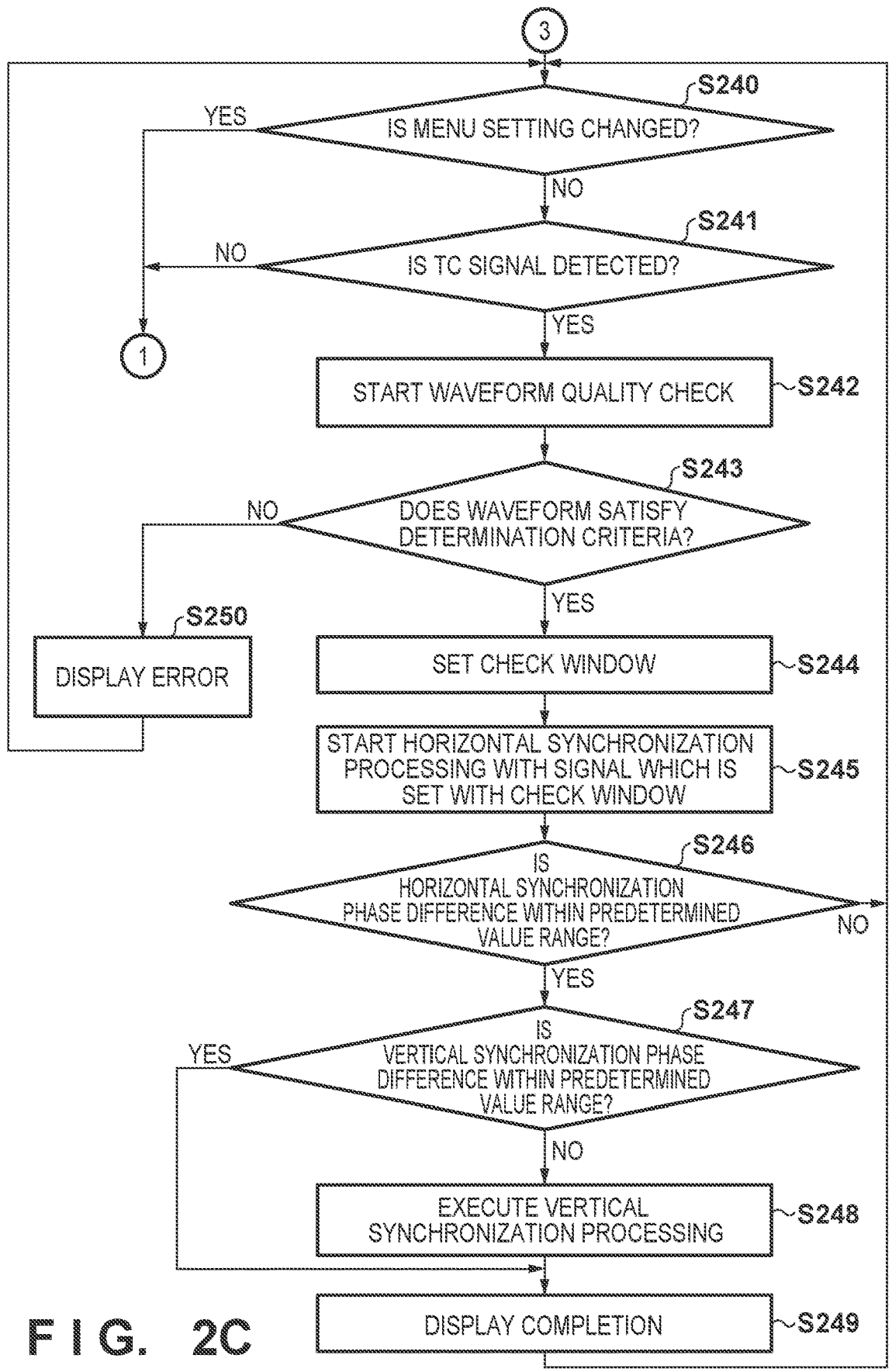
FIG. 2C is a flowchart illustrating a control process executed by a CPU of an image capturing apparatus.

Next, the processing in a case where the "Genlock" mode is set for the submenu 304 will be described, however the processing from step S240 to step S250 of FIG. 2C is the same as the processing from step S220 to step S221, from step S223 to step S230, and step S232 of FIG. 2B and thus description thereof will be omitted. In a case where the "Genlock" mode is set for the submenu 304, genlocking is executed using the TC signal. Also, the timecode is not taken, the processing to overwrite the timecode is not executed, and timecode synchronization is not executed.

The example described above has been an example of the control processing can be executed with the Timecode mode set as "Preset", the Timecode Run set as "Free Run", and the TC In/Out set as "In".

There are numerous combinations of the menu settings items, however operations can be limited in each of them.

Figure 3B:
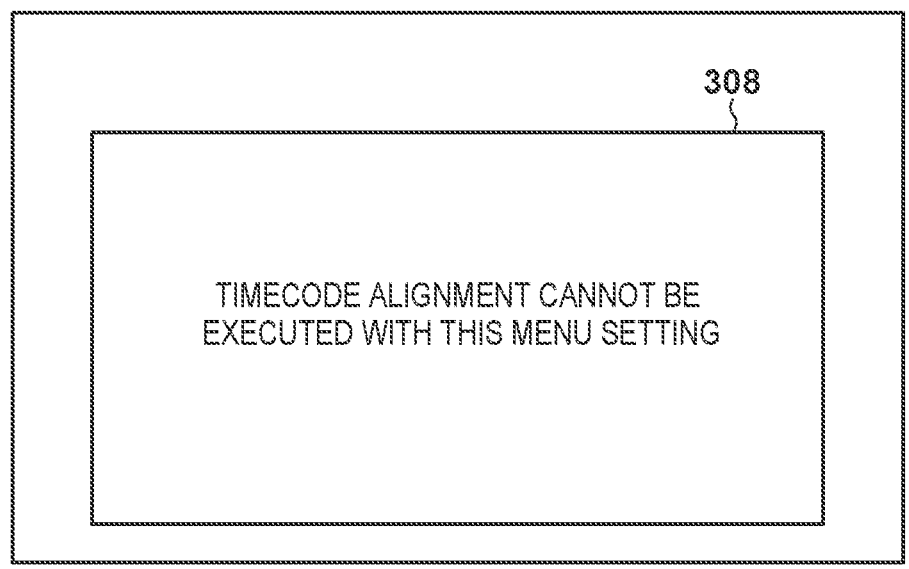

For example, take an example in which the Timecode mode is set as "Regen" or the Timecode Run is set as "Rec Run" and the TC In/Out is set as "In". In this case, when "Timecode" is set for the TC In mode, the timecode does not advance, and thus timecode alignment (timecode synchronization) is preferably not executed. In a similar manner, when "Genlock+Timecode" is set for the TC In mode, the timecode does not advance except while "Rec Run" is set, and thus timecode alignment (timecode synchronization) is preferably not executed and only genlocking using the TC signal is preferably executed. Also, when the timecode is not advancing, it is possible for no control to be executed. In this case, the CPU 101 preferably displays a warning message 308 illustrated in FIG. 3B on the display panel 111 to warn the user. In this manner, when the Timecode mode is set to "Regen" or the Timecode Run is set to "Rec Run", even when the submenu 304 is set to "Timecode" mode or "Genlock+Timecode" mode, timecode synchronization is preferably not executed. Alternatively, for the submenu 304, "Timecode" mode and "Genlock+Timecode" mode may be unselectable, and "Genlock" mode and "none" (no Genlock) may be selectable.

Control different from the user settings can be changed to and synchronization executed. For example, take an example in which the Timecode mode is set as "Regen" or the Timecode Run is set as "Rec Run" and the TC In/Out is set as "In". Here, in a case where the TC In mode is set to "Genlock Timecode", the Timecode Run is changed from "Rec Run" to "Free Run" and timecode synchronization can be executed. Accordingly, in a case where the TC In mode is set to "Genlock+Timecode with "Rec Run" set, the Timecode Run settings may be automatically changed from "Rec Run" to "Free Run".

As described above, the first embodiment is advantageous is that, with a simple user operation, the user can select their desired control, and, in a case where video signal synchronization is executed, the signal waveform able to be used in the control of the TC signal can be selectively extracted and control can be executed to reduce the processing time.

Note that in the embodiment described above, the user is notified of various state via the flashing or lighting up of icons and via different flashing speeds. However, it is only required that the different states can be identified, and the size or color of the icon may be used to notify the user of the different states via various display modes.

Second Embodiment

Figure 5:
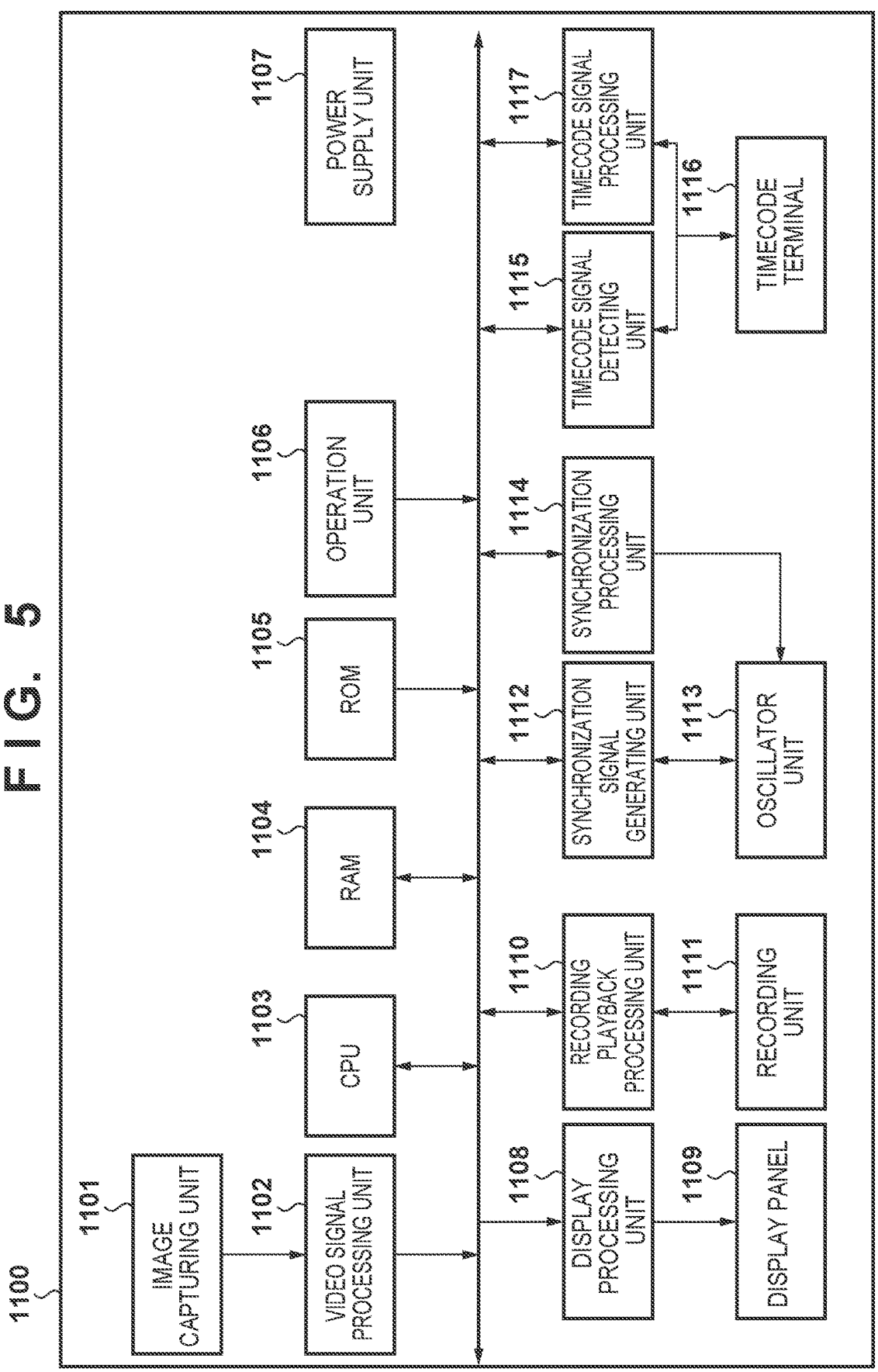
FIG. 5 is a block configuration diagram of an image capturing apparatus.

FIG. 5 is a block configuration diagram of an image capturing apparatus 1100 of the second embodiment represented by a video camera into which a TC signal can be input from the outside.

An image capturing unit 1101 converts an optical image of a subject captured by an imaging lens (not illustrated) into an electrical signal via an image sensor (not illustrated) and outputs the converted signal into a video signal processing unit 1102. The video signal processing unit 1102 executes image processing, such as A/D conversion processing or amplification processing, on the electrical signal obtained from the image capturing unit 1101 and generates video data. The video data may be stored in a RAM 1104 as appropriate, or may be sent to the display processing unit 1108 or a recording playback processing unit 1110 without going through the RAM 1104.

A CPU 1103 executes various control by executing a control program stored in ROM 1105. The RAM 1104 is used in storing data when the CPU 1103 executes a program. Also, the RAM 1104 is used to temporarily store video data. The ROM 1105 can be used to store programs as well as display data and the like. The CPU 1103 sends instructions to the other units on the basis of an input operation received from the user via an operation unit 1106. For example, the CPU 1103 can start or stop recording of video by sending a start or stop instruction to the recording playback processing unit 1110. Also, in a case where a menu display operation is performed, the CPU 1103 sends display data read out from the ROM 1105 to the display processing unit 1108 to display the menu.

The operation unit 1106 is constituted by a button, switch, or a touch panel. However, any type may be used as long as the configuration allows the user to input an instruction to the functional blocks of the image capturing apparatus 1100.

A power supply unit 1107 supplies power to the blocks of the image capturing apparatus 1100 in response to a supply power instruction input by the user via the operation unit 1106.

The display processing unit 1108 combines the video data generated by the video signal processing unit 1102 or the video data reproduced by the recording playback processing unit 1110 and the display data the CPU 1103 reads out from the ROM 1105, and outputs this composite data as a video signal to a display unit 1109.

The display unit 1109 is constituted by a display element such as a liquid crystal panel and displays the video signal output from the display processing unit 1108. Also, the display unit 1109 may be a unit separate from the video camera, such as an external monitor, for example.

The recording playback processing unit 1110 has a function of encoding (compressing) and decoding (expanding) the video signal and encodes the video signal generated by the video signal processing unit 1102 and records the encoded video signal as a video file in a recording unit 1111. The encoding method is, for example, MPEG-2 (developed by the Moving Picture Experts Group (MPEG)) H.264, H.265, or the like. Also, when the recording playback processing unit 1110 receives an instruction from the CPU 1103 to reproduce the video file, the desired video file is read out from the recording unit 1111 and decoded and video data is generated.

The recording unit 1111 is, for example, a recording medium that allows for random access such as a flash memory card. The recording unit 1111 is detachably attached to the video camera via an insertion and ejection mechanism (not illustrated). Also, the CPU 1103 manages the various data to be recorded in the recording unit 1111 as files in accordance with a known file system such as a file allocation table (FAT) file system.

A synchronization signal generating unit 1112 generates a video horizontal synchronizing signal and a video vertical synchronizing signal based on a clock supplied from an oscillator unit 1113 and supplies the signals to the other units. The horizontal synchronizing signal and the vertical synchronizing signal are synchronized, then video signal processing and display processing are executed. Also, the synchronization signal generating unit 1112 generates a jam sync TC signal based on the clock supplied from the oscillator unit 1113 and sends the bit switch timing and frame switch timing of the jam sync TC signal to a synchronization processing unit 1114. The TC signal will be described in detail below.

The oscillator unit 1113, for example, includes a device that supplies a clock with an adjustable frequency such as a voltage controlled crystal oscillator (VCXO).

The CPU 1103 also generates a timecode. The timecode includes hours, minutes, seconds, frames, field bits, and user bits. The CPU 1103 stores the current timecode in the RAM 1104 and, when video data is generated at the video signal processing unit 1102, assigns a timecode to the video data. Then, the stored timecode is advanced. The timecode assigned to the video data is displayed superimposed on the video data by the display processing unit 1108 and recorded in the video data and the video file at the recording playback processing unit 1110. When the timecode is set via a menu operation or the like, the CPU 1103 overwrites the stored timecode with the set value.

A timecode signal detecting unit 1115 detects whether or not a TC signal has been input into a timecode terminal 1116 from outside. The CPU 1103 can learn of the TC signal input state by querying the timecode signal detecting unit 1115. When an TC signal is detected, the CPU 1103 instructs the synchronization processing unit 1114 to start synchronization processing using the TC signal.

A timecode signal processing unit 1117 extracts a timecode from the TC signal and notifies the CPU 1103. The timecode is updated each frame. Thus, the CPU 1103 can obtain the timecode of each frame, verify whether the timecode is an incorrect value, and, in a case where the timecode is not an incorrect value, overwrite the timecode stored in the RAM 1104 with this value.

Furthermore, the timecode signal processing unit 1117 detects the bit switch timing and the frame switch timing from the TC signal and sends a signal indicating these timings to the synchronization processing unit 1114.

The TC signal will now be described in detail. The TC signal has 80 bits per frame. The contents of each bit are as illustrated in FIG. 6. Bit numbers 0 to 3 represent frame number units, 4 to 7 represent user bit field 1, and 8 to 9 represent frame number tens. Bit numbers 10 to 11 represent flags, 12 to 15 represent user bit field 2, 16 to 19 represent seconds units, 20 to 23 represent user bit field 3, 24 to 26 represent seconds tens, and 27 represents a flag. Bit numbers 28 to 31 represent user bit field 4, 32 to 35 represent minutes units, 36 to 39 represent user bit field 5, 40 to 42 represent minutes tens, 43 represents a flag, and 44 to 47 represent user bit field 6. Bit numbers 48 to 51 represent hours units, 52 to 55 represent user bit field 7, 56 to 57 represent hours tens, 58 to 59 represent flags, 60 to 63 represent user bit field 8, and 64 to 79 represent a sync word.

The time address is constituted by a total of 26 units, bit numbers 0 to 3, 8 to 9, 16 to 19, 24 to 26, 32 to 35, 40 to 42, 48 to 51, and 56 to 57. This allows one specific frame to be expressed from a frame 00 hours 00 minutes 00 seconds 00 frames to a frame 23 hours 59 minutes 59 seconds 29 frames. The user bits are constituted by 32 bits, bit numbers 4 to 7, 12 to 15, 20 to 23, 28 to 31, 36 to 39, 44 to 47, 52 to 55, and 60 to 63. The user can set a discretionary value for these. The flag bits are constituted by a total of 6 bits including bit numbers 10 to 11, 27, 43, and 58 to 59. These indicate dropped frames, are used for polarity inversion of the TC signal, are used for indicating a user bit attribute, and the like. The sync word is constituted by bit numbers 64 to 79 and is used for indicating the frame switch timing. The sync word is a unique pattern that cannot appear in other fields. The values in order from bit number 64 are "0011111111111101". As described above, the contents of the 80 bits of the TC signal include 26 bits for time address, 32 bits for user bits, 6 bits for flag bits, and 16 bits for the sync word.

Figure 7A:
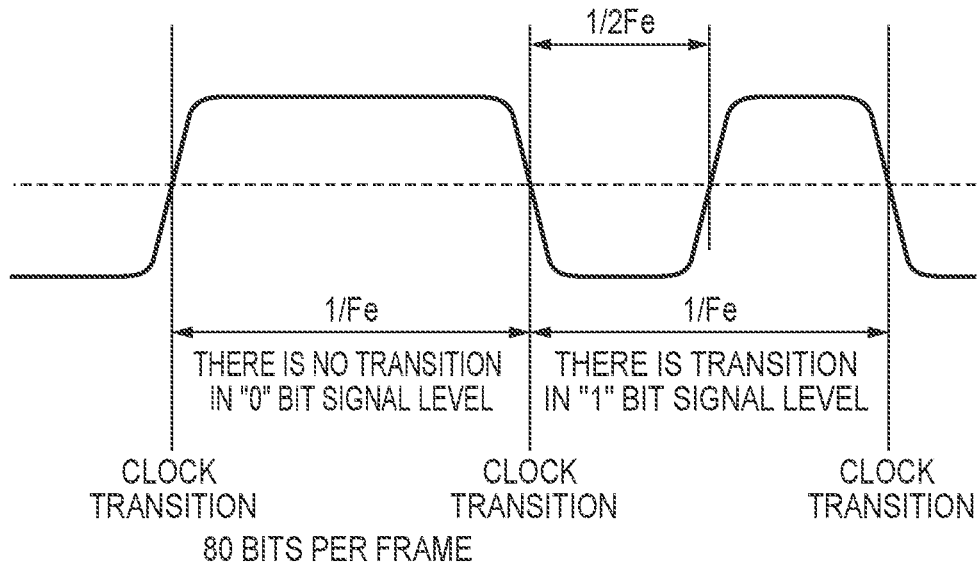
FIGS. 7A and 7B are diagrams illustrating signal waveforms of a TC signal.
Figure 7B:
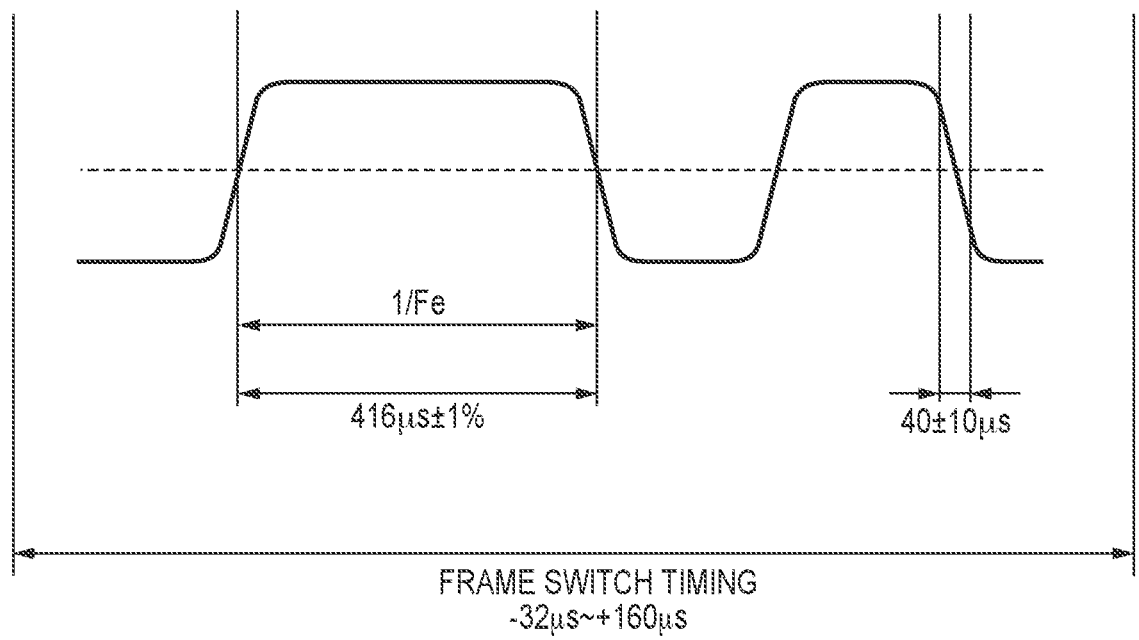

Also, the TC signal is transmitted using a high/low binary voltage via a single signal line. FIGS. 7A and 7B illustrate the signal waveform of the TC signal. The TC signal is transferred in order from bit number 0 and switches signal level without fail at the bit switch timing. The modulation method used is the biphase mark modulation method, whereby in a case of a logical value of "0", there is no transition in the signal level during the time of 1 bit and in a case of a logical value of "1", there is a transition in the signal level in the middle of the time of 1 bit. In other words, in a case of a logical value of "0", there is one transition in the signal level per 1 bit, and in a case of a logical value of "1", there are two transitions in the signal level per 1 bit. In a case where the frame rate is 30 Hz, 1/Fe of FIG. 7A is 416 μsec (hereinafter, simply written as μs), and 1/2Fe is 208 μs.

Next, the synchronization processing will be described. The synchronization processing unit 1114 uses the clock supplied from the oscillator unit 1113 to count the length between bit switch timings of the input TC signal sent from the timecode signal processing unit 1117. Also, when the synchronization processing unit 1114 receives a synchronization processing start instruction from the CPU 1103, the synchronization processing unit 1114 compares the length between the bit switch timings of the jam sync TC signal generated at the synchronization signal generating unit 1112 and the length between bit switch timings of the input TC signal detected at the timecode signal processing unit 1117, executes feedback control on the oscillator unit 1113 to eliminate this difference, and controls the frequency of the clock output by the oscillator unit 1113. Furthermore, when the difference between the length between the bit switch timings of the jam sync TC signal and input TC signal is within a predetermined range, the synchronization processing unit 1114 notifies the CPU 1103 of the completion of clock synchronization.

Next, the CPU 1103 queries the synchronization processing unit 1114 requesting the phase difference between the frame switch timing of the jam sync TC signal generated at the synchronization signal generating unit 1112 and the frame switch timing of the input TC signal detected at the timecode signal processing unit 1117. Then, the CPU 1103 notifies the synchronization signal generating unit 1112 of the phase difference obtained from the synchronization processing unit 1114.

By the synchronization signal generating unit 1112 re-outputting the jam sync TC signal and the video synchronizing signal adjusted by an amount equivalent to the phase difference reported by the CPU 1103, the difference between the jam sync input signal and the input TC signal can be set within the predetermined range.

Figure 8:
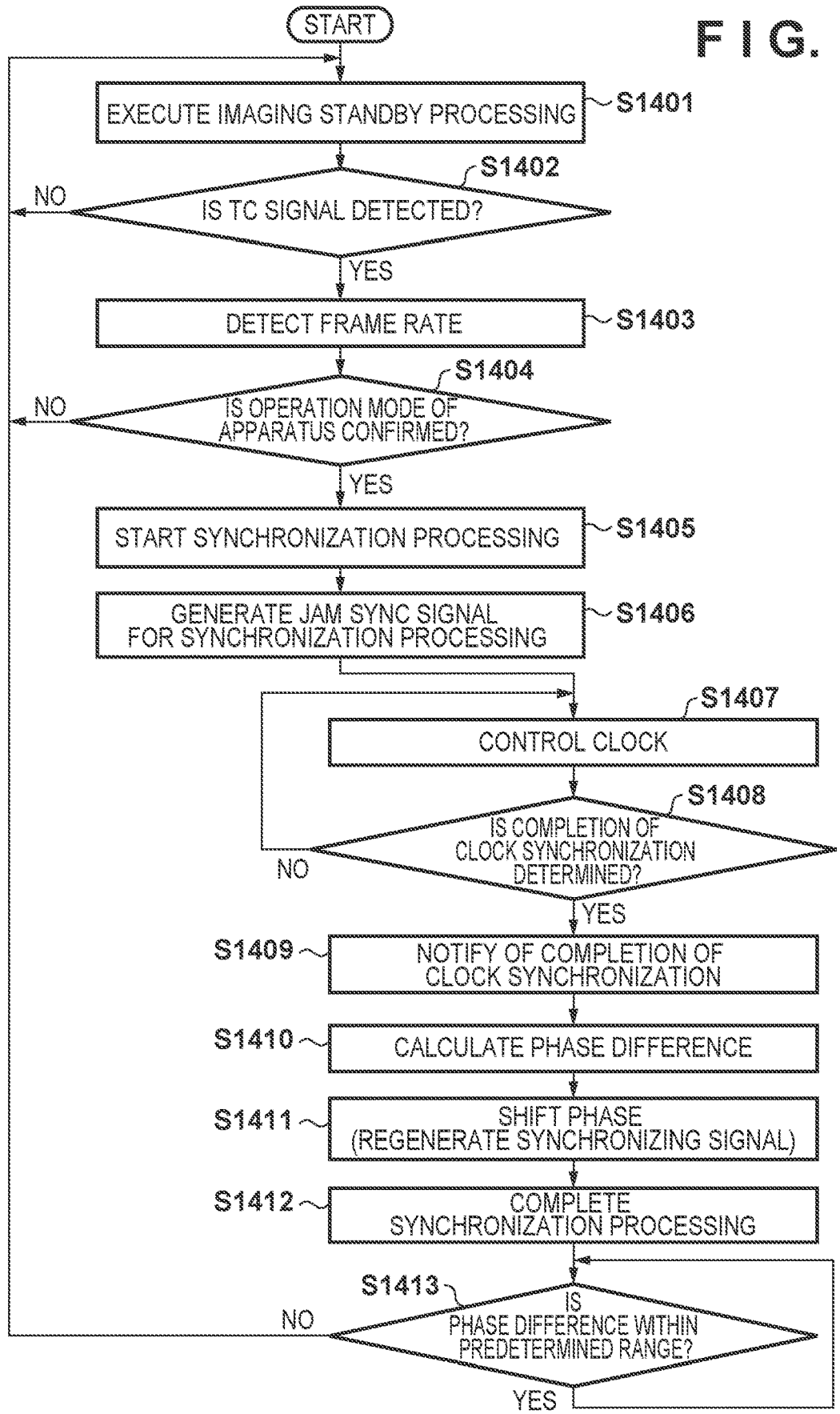
FIG. 8 is a flowchart illustrating a synchronization processing process according to a second embodiment.

The synchronization processing by the CPU 1103 in the image capturing apparatus 1100 using the TC signal will now be described in detail using the flowchart of FIG. 8.

First, when the user operates the operation unit 1106 and power is supplied to the image capturing apparatus 1100, the CPU 1103 executes imaging standby processing (step S1401). In imaging standby processing, the CPU 1103 displays on the display unit 1109 display data, such as video captured by the image capturing unit 1101, a menu read out from the ROM 1105, and the like. The user looks at the display unit 1109 and operates the operation unit 1106 to setup the image capturing apparatus 1100.

Next, the CPU 1103 controls the timecode signal detecting unit 1115 and causes the timecode signal detecting unit 1115 execute detection of a TC signal from an external device (for example, another image capturing apparatus or the like) input into the timecode terminal 1116. When the CPU 1103 receives a notification of the detection of a TC signal from the timecode signal detecting unit 1115, the processing proceeds to step S1403. In step S1403, the CPU 1103 controls the timecode signal detecting unit 1115 and causes the timecode signal detecting unit 1115 to determine the frame rate of the input TC signal from the length between the frame switch timings of the input TC signal to obtain a determination result.

In step S1404, the CPU 1103 determines whether or not to start synchronization processing on the basis of the operation mode set in the imaging standby processing of step S1401 and the frame rate of the input TC signal reported by the timecode signal detecting unit 1115. Specifically, the CPU 1103 determines to start synchronization processing in a case where the frequency of the frame rate indicated by the operation mode of the apparatus is a multiple of the frame rate indicated by the input TC signal. For example, in a case where the frame rate indicated by the input TC signal is 30 Hz and the operation mode of the image capturing apparatus 1100 is 30 Hz, 60 Hz, or the like, synchronization processing is started.

Note that in a case where the frame rate of the operation mode of the apparatus is not a multiple of the frame rate of the input TC synchronization processing cannot be started. Thus, the CPU 1103 returns the processing to step S1401. In this case, the CPU 1103 displays on the display unit 1109 a message inquiring as to whether or not the frame rate of the operation mode of the apparatus and the frame rate of the input TC signal are the same, and in a case where the user inputs an "OK" instruction, the processing may proceed to step S1405.

In a case where synchronization processing is started, the CPU 1103 first sets it so that operations from the user such as start recording are not accepted until the synchronization processing is complete (step S1405).

Next, in step S1406, the CPU 1103 controls the synchronization signal generating unit 1112 and causes the synchronization signal generating unit 1112 to generate a jam sync TC signal with the same frame rate as that of the input TC signal and notifies the synchronization processing unit 1114 of the bit switch timing and the frame switch timing of the jam sync TC signal.

In step S1407, the synchronization processing unit 1114, controlled by the CPU 1103, compares the length between the bit switch timings of the jam sync TC signal generated at the synchronization signal generating unit 1112 and the length between bit switch tunings of the input TC signal detected at the timecode signal processing unit 1117 and executes feedback control relating to the frequency of the clock output by the oscillator unit 1113 to eliminate this difference.

In step S1408, the processing of step S1407 repeats until the difference between the length between the bit switch timings of the jam sync TC signal and input TC signal is determined to be within the predetermined range by the synchronization processing unit 1114. Furthermore, when the difference between the length between the bit switch timings of the jam sync TC signal and input TC signal is determined to be within the predetermined range (YES in step S1408), the synchronization processing unit 1114 notifies the CPU 1103 of the completion of clock synchronization (step S1409).

Also, the synchronization processing unit 1114 calculates the phase difference between the frame switch timing of the jam sync TC signal generated at the synchronization signal generating unit 1112 and the frame switch timing of the input TC signal detected at the timecode signal processing unit 1117 and notifies the CPU 1103 (step S1410).

Then, the CPU 1103 notifies the synchronization signal generating unit 1112 of the phase difference reported by the synchronization processing unit 1114. The synchronization signal generating unit 1112 re-outputs the jam sync TC signal and the video synchronizing signal adjusted by an amount equivalent to the phase difference reported by the CPU 1103 (step S1411). In this manner, the phase difference between the frame switch timing of the jam sync TC signal and the frame switch timing of the input TC signal can be set within the predetermined range. When the phase difference is within the predetermined range, in step S1412, the synchronization processing unit 1114 notifies the CPU 1103 of the completion of synchronization processing.

When the CPU 1103 receives the notification of the completion of synchronization processing, the CPU 1103 once again allows operations from the user such as start recording to be accepted.

After the completion of synchronization processing, in step S1413, the CPU 1103 continuously periodically confirms the phase difference reported by the synchronization processing unit 1114. For example, in a case where a notification is received that the phase difference reported by the synchronization processing unit 1114 is greater than the predetermined phase difference (NO in step S1413) due to the input TC signal disappearing, the frame rate of the input TC signal being changed, or the operation mode of the image capturing apparatus 1100 being changed and the frame rate of the jam sync TC signal changing, the CPU 1103 returns to the imaging standby processing of step S1401 and repeats the processing.

Figure 9:
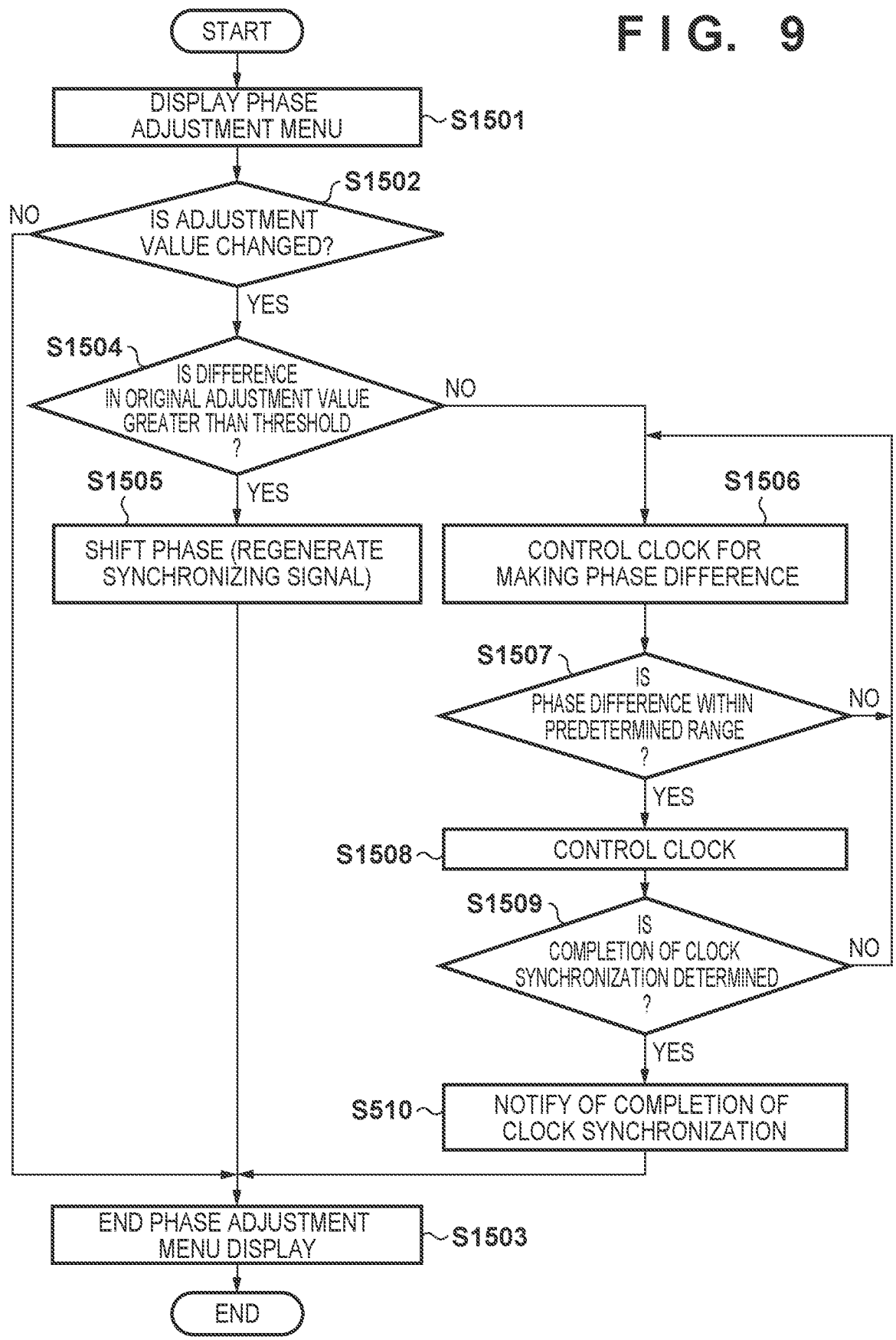
FIG. 9 is a flowchart illustrating a phase adjustment process according to the second embodiment.

Next, the phase adjustment processing executed after the completion of the synchronization processing in response to an operation of the operation unit 1106 by the user will be described in detail using the flowchart of FIG. 9.

Figure 10:
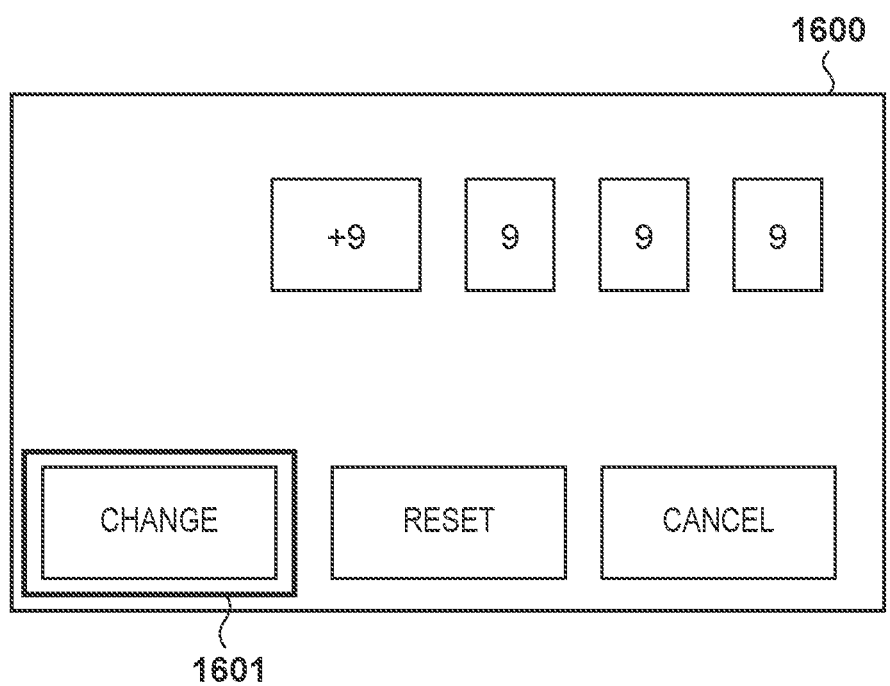
FIG. 10 is a diagram illustrating a phase adjustment menu screen according to the second embodiment.

First, when a predetermined operation of the operation unit 1106 by the user is detected, the CPU 1103 displays on the display unit 1109 a phase adjustment menu screen 1600 illustrated in FIG. 10 and accepts phase adjustment settings (step S1501).

By operating the operation unit 1106, the user can move a cursor 1601 displayed on the phase adjustment menu screen 1600. In a case where the CPU 1103 determines that a "Cancel" button for cancelling phase adjustment processing or a "Reset" button for returning the setting value to its original value has been designated by a user operation (NO in step S1502), phase adjustment processing is not executed, and the phase adjustment menu display ends (step S1503).

In a case where there is an operation of the operation unit 1106 by a user to change the adjustment value displayed on the phase adjustment menu screen 1600 and designate the "Change" button (YES in step S1502), the CPU 1103 stores the set adjustment value in the RAM 1104.

In the present embodiment, the phase adjustment value can be changed to a value from −9999 to +9999, and according to the adjustment value, the phase of the frame switch timing of the jam sync TC signal can be offset by from −200 μs to +200 μs with respect to the frame switch timing of the input TC signal.

In step S1504, the CPU 1103 determines whether or not the difference (absolute value) between the adjustment value newly set by a user and the adjustment value set previously stored in the RAM 1104 is greater than a predetermined threshold. In a case where the difference in the adjustment value is greater than the predetermined threshold (YES in step S1504), the CPU 1103 notifies the synchronization signal generating unit 1112 of the phase difference corresponding to the difference between the adjustment values. The synchronization signal generating unit 1112 re-outputs the jam sync TC signal and the video synchronizing signal adjusted by an amount equivalent to the phase difference reported by the CPU 1103 (step S1505). In this manner, the phase difference of the frame switch timing of the jam sync TC signal to the frame switch timing of the input TC signal can be set to a phase difference corresponding to the value set at the phase adjustment menu screen 1600. Then, the CPU 1103 ends the phase adjustment menu display (step S1503).

In a case where the difference between an adjustment value newly set by the user and the adjustment value set previously stored in the RAM 1104 is equal to or less than the predetermined threshold (NO in step S1504), the CPU 1103 proceeds the processing to step S1506.

In step S1506, the CPU 1103 notifies the synchronization processing unit 1114 of the phase difference corresponding to the difference between the adjustment values. As a result, the synchronization processing unit 1114 executes control to increase or decrease the frequency of the clock output by the oscillator unit 1113 by a preset amount $\Delta f$. By executing control in this manner, the jam sync TC signal is made shorter or longer relative to the input TC signal, and the phase difference between the frame switch timing of the jam sync TC signal and the frame switch timing of the input TC signal can be gradually increased.

In step S1507, the synchronization processing unit 1114, controlled by the CPU 1103, determines whether or not the phase difference between the frame switch timing of the jam sync TC signal and the frame switch timing of the input TC signal is equal to the phase difference reported by the CPU 1103. Also, the synchronization processing unit 1114 repeats the processing of step S1506 until the phase differences are equal. In a case where YES is determined in step S1507, in step S1508, the synchronization processing unit 1114, controlled by the CPU 1103, compares the length between the bit switch timings of the jam sync TC signal and the length between bit switch timings of the input TC signal and executes feedback control relating to the frequency of the clock output by the oscillator unit 1113 to eliminate this difference.

In step S1509, the synchronization processing unit 1114, controlled by the CPU 1103, determines whether the difference between the length between the bit switch timings of the jam sync TC signal and input TC signal is within the predetermined range. When the difference between the length between the bit switch timings of the jam sync TC signal and input TC signal is determined to be within the predetermined range (YES in step S1509), the synchronization processing unit 1114 notifies the CPU 1103 of the completion of clock synchronization (step S1510). In step S1503, the CPU 1103 having received this notification ends the phase adjustment menu display.

According to the configuration described above, in a case where phase adjustment is executed by reproducing a phase-shifted synchronizing signal (step S1505), because the synchronizing signal supplied from the synchronization signal generating unit 1112 is discontinuous, a video signal or display synchronized with this synchronizing signal and processed will be temporarily disarranged.

In a case where phase adjustment is executed via clock control (step S1506), because the synchronizing signal supplied from the synchronization signal generating unit 1112 is continuous, the video signal or display is not disarranged. However, because the phase difference can only be increased in small increments, making a large phase difference takes time.

Regarding this, according to the present embodiment, as illustrated in FIG. 10, the phase adjustment method can be switched according to the value set by the user. As a result, when the desired adjustment in the phase is relatively small, phase adjustment can be executed without causing disarrangement of the video signal or display, and when the desired adjustment in the phase is large, phase adjustment can be executed without too much time being taken.

Note that in the present embodiment, the range of the value able to be set via the phase adjustment menu screen is from −9999 to +9999, and according to the adjustment value, the phase can be adjusted by from −200 µs to +200 µs. However, the range of the value able to be set and the range of the phase adjustment according to the adjustment value are not limited by these values and may be changed according to the operation mode (frame rate) of the image capturing apparatus 1100. Also, in a similar manner, the threshold described above may be a fixed value or may be changed according to the operation mode of the image capturing apparatus 1100.

Specific examples of the phase adjustment range and threshold according to operation modes are given below. Note that hereinafter, xP represents a frame rate of x frames per second.

In a case where the frame rate is 30 P, 25 P, and 24 P, the time width per 1 bit of the TC signal is obtained by the following Formulas (1), (2), and (3), respectively.

$$1 \div 30 \div 80 \approx 417 \text{ µs} \quad (1)$$

$$1 \div 25 \div 80 \approx 500 \text{ µs} \quad (2)$$

$$1 \div 24 \div 80 \approx 521 \text{ µs} \quad (3)$$

Also, when the recording resolution of the image capturing apparatus 1100 is 1920×1080 and the frame rate is 30 P, 25 P, and 24 P, a video signal including a vertical blanking region has 1125 lines, and the time per 1 line is obtained by the following Formulas (4), (5), (6), respectively.

$$1 \div 30 \div 1125 \approx 29.6 \text{ µs} \quad (4)$$

$$1 \div 25 \div 1125 \approx 35.6 \text{ µs} \quad (5)$$

$$1 \div 24 \div 1125 \approx 37.0 \text{ µs} \quad (6)$$

Also, when the recording resolution of the image capturing apparatus 1100 is 1280×720 and the frame rate is 30 P, 25 P, and 24 P, a video signal including a vertical blanking region has 750 lines, and the time per 1 line is obtained by the following Formulas (7), (8), (9), respectively.

$$1 \div 30 \div 750 \approx 44.4 \text{ µs} \quad (7)$$

$$1 \div 25 \div 750 \approx 53.3 \text{ µs} \quad (8)$$

$$1 \div 24 \geq 750 \approx 55.6 \text{ µs} \quad (9)$$

Using these calculates, the values of the width of the range of phase adjustment when the frame rate of the image capturing apparatus 1100 is 30 P, 25 P, and 24 P are set to the values obtained by Formulas (1), (2), and (3).

In other words, the range of phase able to be adjusted according to the value changed from −9999 to +9999 on the phase adjustment menu screen 1600 is changed like the value obtained by Formulas (1), (2), and (3). Then, concurrently, the resolution of the phase able to be adjusted is also changed according to the operation mode.

Also, when the recording resolution of the image capturing apparatus 1100 is 1920×1080 and the frame rate is 30 P, 25 P, and 24 P, the threshold is se to the values obtained by Formulas (4), (5), and (6), respectively, and when the recording resolution of the image capturing apparatus 1100 is 1280×720 and the frame rate is 30 P, 25 P, and 24 P, the threshold is set to the values obtained by Formulas (7), (8), and (9).

Setting the phase adjustment ranges and the thresholds in this manner allows the user to conceptualize the video format and more intuitively execute phase adjustment.

Third Embodiment

The third embodiment will be described below. Note that in the third embodiment, components similar to that of the second embodiment are given the same reference sign and redundant descriptions will be omitted.

In the second embodiment described above, the phase adjustment method is switched depending on whether or not the difference between the phase adjustment value newly set by the user and the phase adjustment value previously set is greater than a predetermined threshold. Thus, when the desired adjustment in the phase is small, phase adjustment can be executed without causing disarrangement of the video signal or display, and when the desired adjustment in the phase is large, phase adjustment can be executed without too much time being taken.

The third embodiment will be described using an example in which the display and processing make the relationship between the display of the phase adjustment menu screen and the operation when phase adjustment is executed easier for the user to understand.

Figure 11:
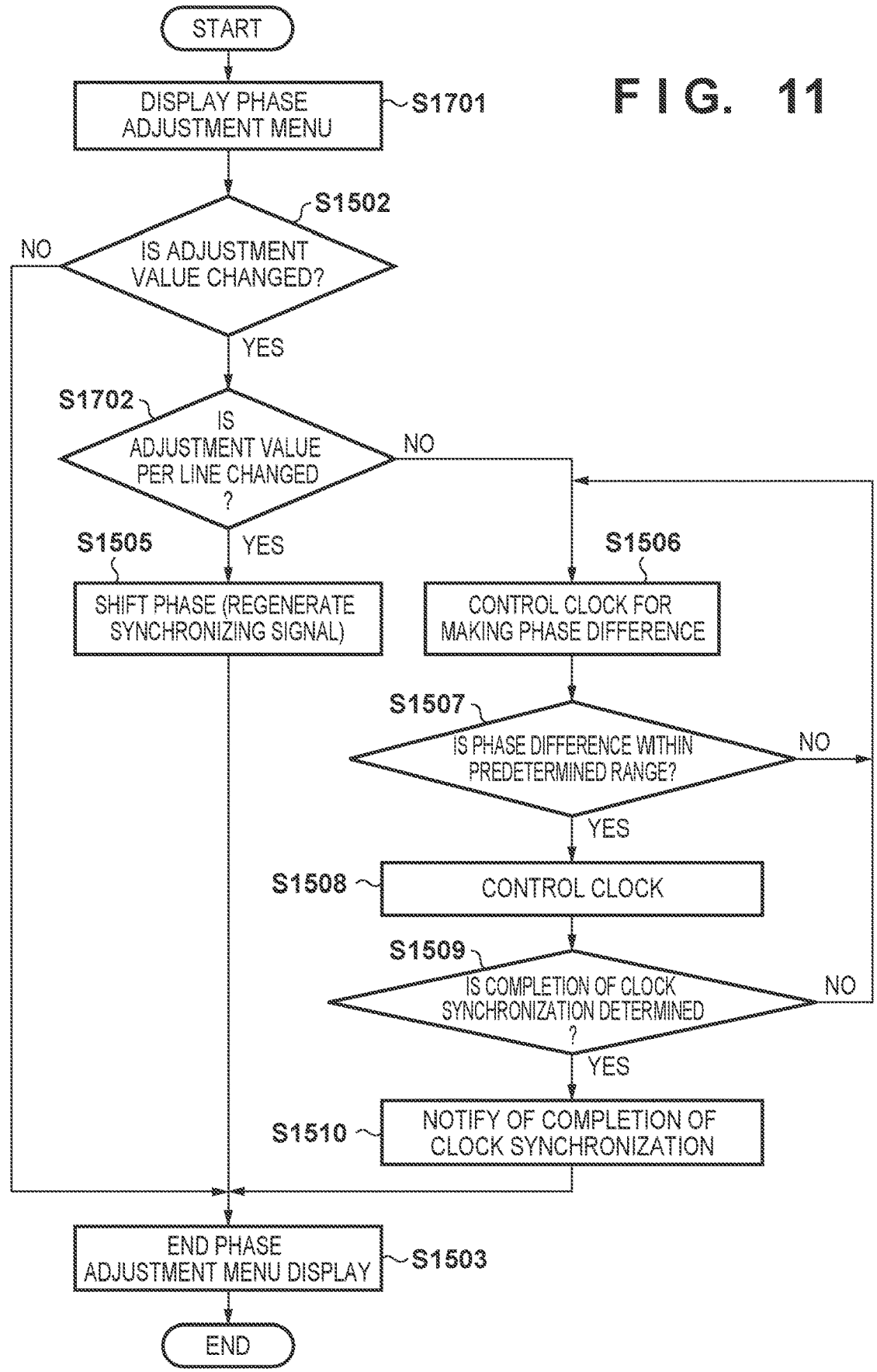
FIG. 11 is a flowchart illustrating a phase adjustment process according to a third embodiment.
Figure 12:
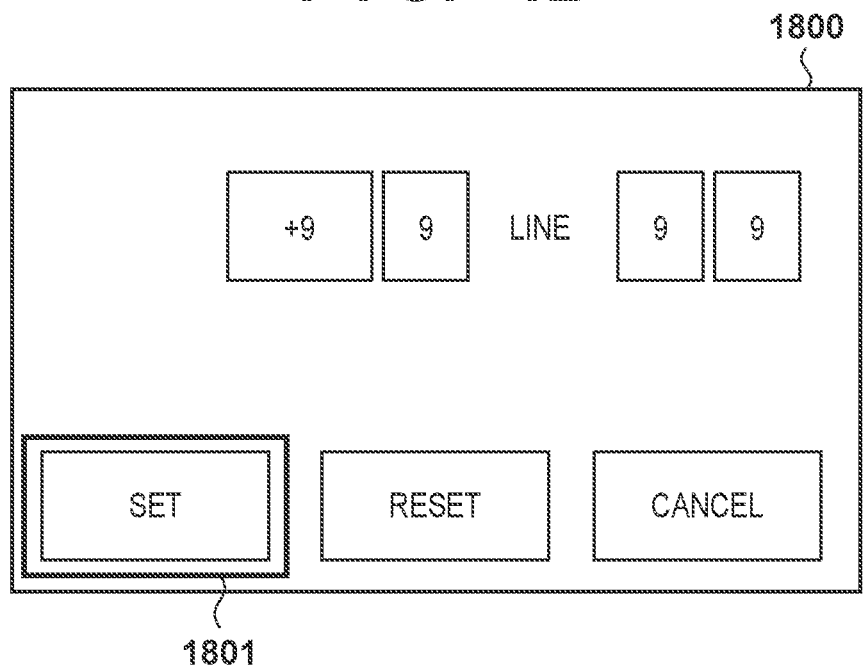
FIG. 12 is a diagram illustrating a phase adjustment menu screen according to the third embodiment.

The processing of the third embodiment executed by the image capturing apparatus of FIG. 5 will be described below using the flowchart of FIG. 11. Note that the flowchart of FIG. 11 is a substitute for the flowchart of FIG. 9, and steps with the same processing contents are given the same reference sign and redundant descriptions are omitted. Also, as in the second embodiment, the CPU 1103 of FIG. 5 that controls the entire image capturing apparatus 1100 executes the present processing by reading a control program stored in the ROM 1105. Also, FIG. 12 illustrates a phase adjustment menu screen 1800 displayed on the display unit 1109 in the third embodiment.

First, when the user operates the operation unit 1106, the CPU 1103 displays on the display unit 1109 the phase adjustment menu screen 1800 and accepts a phase adjustment settings operation from the user (step S1701). By operating the operation unit 1106, the user can move a cursor 1801 displayed on the phase adjustment menu screen 1800 and designate a menu item (value change or button in the settings).

In step S1502, the CPU 1103 determines whether or not the user has changed the setting value. In a case where a "Cancel" button or a "Reset" button has been designated by a user operation (NO in step S1502), the CPU 1103 does not execute phase adjustment processing, and the phase adjustment menu display ends (step S1503).

In the third embodiment, the phase adjustment value for input is divided into a dominant value and a value smaller than the smallest unit of the dominant value. For example, in the example of FIG. 12, the dominant value is input as a line unit, and the smaller unit is input as a percentage from 0 to 99 representing a range less than 1 line. In other words, the adjustment value can be changed to a value from −99 99 to +99 99, and according to the adjustment value, the phase of the frame switch timing of the jam sync TC signal and the frame switch timing of the input TC signal can be offset from one another. Note that in the third embodiment, the value set using the UI of FIG. 12 is the difference with respect to the previous adjustment value already stored in the RAM 1104. Thus, the set value means the difference with respect to the previous value.

Also, the offset phase difference is different depending on the operation mode of the image capturing apparatus 1100, with specific examples being the values per adjustment value 1 line obtained by Formulas (4) to (9).

Herein, in a case where the adjustment value per line is changed and set by the user (YES in step S1702), the CPU 1103 notifies the synchronization signal generating unit 1112 of the phase difference corresponding to the difference between the previously set adjustment value stored in the RAM 1104 and the adjustment value newly set. By the synchronization signal generating unit 1112 re-outputting the jam sync TC signal and the video synchronizing signal adjusted by an amount equivalent to the phase difference reported by the CPU 1103, the phase difference between the frame switch timing of the jam sync TC signal and the frame switch timing of the input TC signal can be set at a phase difference corresponding to the value set at the phase adjustment menu screen 1800 (step S1505). Then, the phase adjustment menu display ends (step S1503).

In a case where the user does not change the line unit adjustment value and only changes the adjustment value for the unit smaller than the line unit (NO in step S1702), the synchronization processing unit 1114 executes control to intentionally speed up or slow down the frequency of the clock output by the oscillator unit 1113 and proceeds with processing to make the phase difference equal the desired value (step S1506).

As describe above, in the third embodiment, in a case where the user changes the line unit adjustment value, the synchronizing signal is reproduced and phase adjustment is executed. This makes the relationship between the display of the phase adjustment menu screen and the operation when phase adjustment is executed easier for the user to understand.

Figure 13:
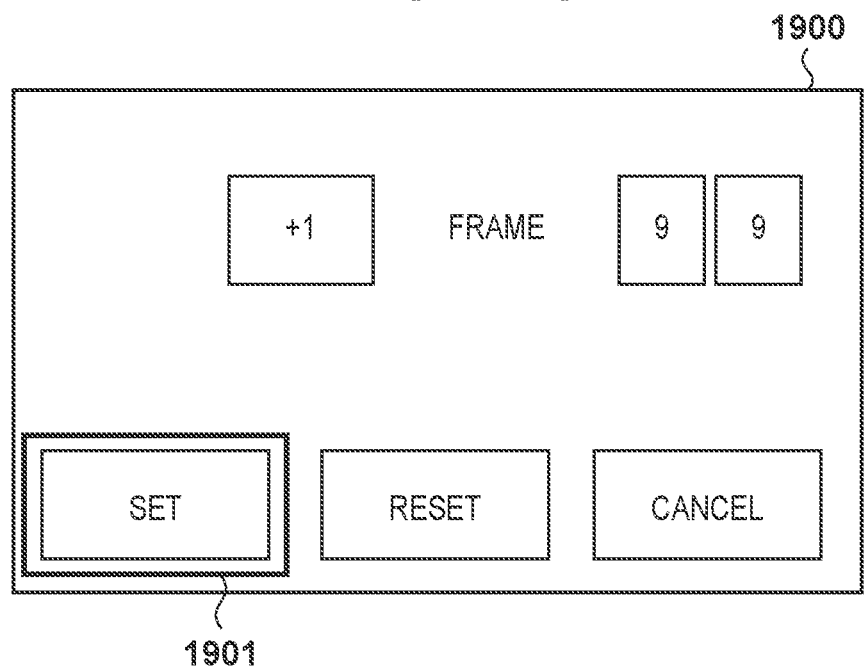
FIG. 13 is a diagram illustrating a phase adjustment menu screen according to the third embodiment.

Note that in the third embodiment, the phase adjustment value is displayed set via line units as illustrated in FIG. 12. However, as illustrated in a menu screen 1900 in FIG. 13, the user may move a cursor 1901 and the value may be displayed set via frame units and, in a case where the phase adjustment value in frame units is changed, the synchronizing signal may be reproduced and phase adjustment may be executed.

Fourth Embodiment

Methods for controlling synchronization processing linked to a phase adjustment menu according to the second and third embodiments have been described above. However, these presuppose an ideal state in which the input TC signal has no variation in waveform. Next, control according to the quality of the TC signal input from an external device will be described.

As illustrated in FIG. 7B, in the TC signal, a certain amount of variation is allowed in terms of the rise and fall of the waveform, the waveform interval of 1 bit, and the interval of 1 frame. For example, the switch timing of 1 frame has tolerance for a maximum variation of 160 µs, and for example, for an operating frequency of 148.5 MHz, a variation greater than 20000 clocks is tolerated. In a case where a TC signal with a large jitter (temporal variation) within the tolerance error range is input, the jam sync signal for synchronization generated in the image capturing apparatus, even if the phase is synchronized at an accuracy of clock units, will be off in terms of time and synchronization phase, leading to the synchronization being out of sync. To solve such problems, the timecode signal detecting unit 1115 of FIG. 5 may additionally execute control to confirm the quality of the input TC signal.

Figure 14A:
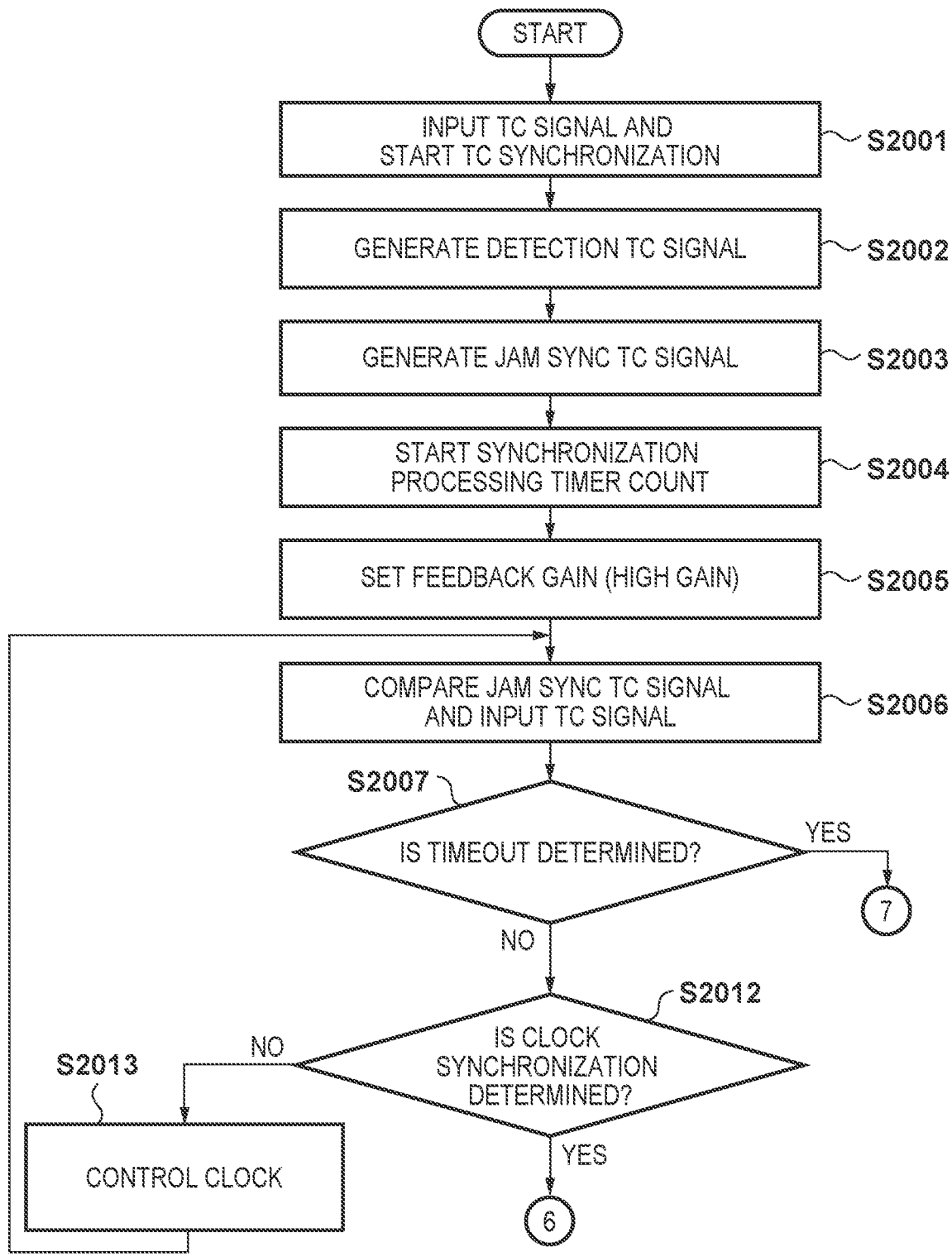
FIGS. 14A to 14C are flowcharts illustrating a synchronization processing process according to a fourth embodiment.

The control series will be described in detail using the flowcharts of FIGS. 14A to 14C. FIG. 14A starts at the point where a TC signal is input and synchronization processing is started (step S2001).

First, the CPU 1103 controls the timecode signal detecting unit 1115 to generate a detection TC signal from the input TC signal (step S2002). This signal is a pulse signal associated with the 80 bits of the TC signal. Also, the CPU 1103 controls the synchronization signal generating unit 1112 to generate a jam sync TC signal for phase synchronization based on the synchronizing signal generated by the synchronization signal generating unit 1112 (step S2003).

Figure 15A:
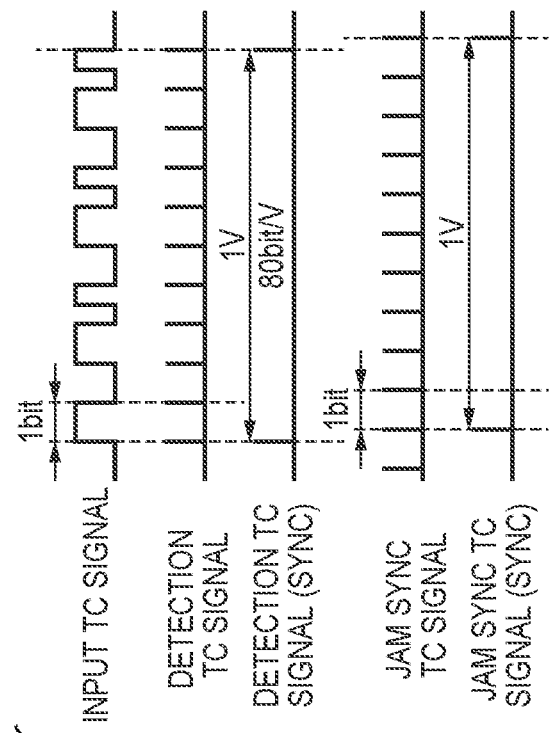
FIGS. 15A to 15C are diagrams illustrating waveforms in synchronization processing according to the fourth embodiment.

These signals are illustrated in FIG. 15A. A pulse signal of 80 bits extracted from the toggle positions of the input TC signal is generated as the detection TC signal. Note that herein, transitions within 1 bit are ignored. Also, by extracting the sync word from the input TC signal, a detection pulse signal with a 1 frame (1V) head (SYNC signal) can also be generated. The jam sync TC signal is a signal generated by the image capturing apparatus 1100 and is set to have a format equal to that of the input TC signal.

After the signals are generated the synchronization processing unit 1114 starts the count (measurement) of the timer for synchronization processing (step S2004). The CPU 1103 controls the oscillator unit 1113 to align the phase of the input TC signal in clock units by increasing or decreasing the frequency of the operating clock. At this time, the initial settings are set to high gain, which is for increasing the control strength (step S2005). High gain in this case means increasing the value of the operating frequency to a setting value high enough to decrease the phase difference of the signals being compared in a short period of time. While the operating clock frequency is being controlled (step S2013), the phase difference in clock units of the detection TC signal obtained from the input TC signal and the jam sync TC signal for phase synchronization is compared (step S2006).

Figure 15B:
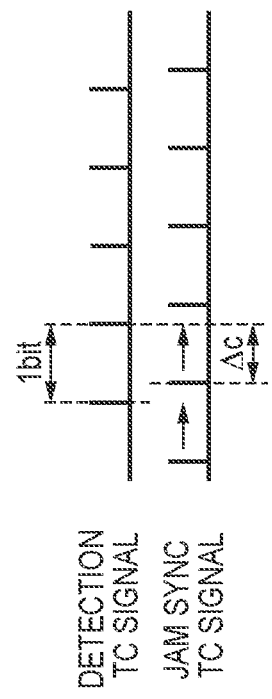

This control is illustrated in FIG. 15B. When the jam sync TC signal causes the oscillator unit 1113 to increase and decrease the operating clock frequency, control is executed to make the detection TC signal and the pulse signal match in time, or in other words, to decrease $\Delta c$. However, as described above, in cases where the variation component in the input TC signal is great or does not even appear in the range illustrated in FIGS. 7A and 7B, when such a signal is input, $\Delta c$ may not be able to be brought within a threshold range even if time is given. For this reason, the timer for synchronization processing is given an upper limit.

Figure 15C:
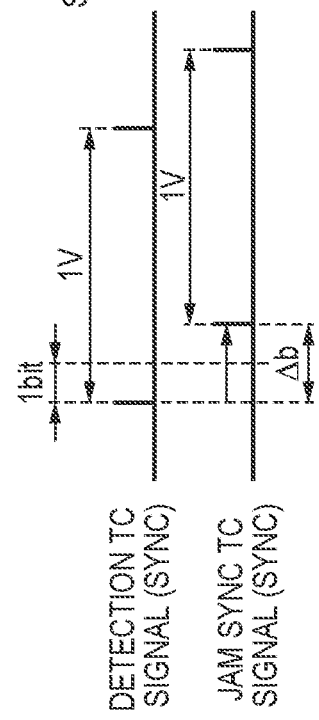

In a case where the counting timer has reached the upper limit, the CPU 1103 determines that a TC signal unsuitable for synchronization processing has been input and ends clock control (YES in step S2007). Even in a case where synchronization in clock units cannot be executed, the CPU 1103 executes synchronization processing in frame units. The CPU 1103 uses a detection pulse to detect the sync word of the input TC signal and the jam sync TC signal and detects the difference therebetween as a frame phase difference (step S2008). Here, the frame phase difference means a difference between the sync word of the input TC signal and the sync word of the jam sync TC signal in how many data bits are included. This phase difference is a large value with respect to time in clock units. Thus, even if the input TC signal is a signal waveform not suitable for synchronization processing, in the case of the timing of 1 frame being roughly the same, phase adjustment can be executed. The CPU 1103 controls the synchronization signal generating unit 1112 to execute control, shifting the synchronizing signal in data bit units and bring together the frame phase difference (step S2009). Thereafter, the image capturing apparatus 1100 ends synchronization processing control (step S2010) and issues a completion flag (step S2011). Then, the CPU 1103 obtains a timecode value from the TC signal last input (step S2030). In this case, synchronization in clock units is problematic for the CPU 1103 and, although synchronization processing in frame units is executed, the resultant is in an insufficient state, resulting in the processing ending with a low synchronization accuracy. This control is illustrated in FIG. 15C. The bit phase difference $\Delta b$ between the SYNC pulse of the detection TC signal and the SYNC pulse of the jam sync TC signal is detected, and phase shift control is executed to reduce this bit phase difference $\Delta b$.

Next, a case will be described where the upper limit of the timer for synchronization processing is not reached and $\Delta c$ is within a predetermined setting value range (YES in step S1012). In this case, the CPU 1103 executes synchronization processing with higher accuracy.

First, the CPU 1103 clears the timer for synchronization processing (step S2014) and restarts the count of the timer for synchronization processing (step S2015). The CPU 1103 controls the oscillator unit 1113 to align the phase of the input TC signal in clock units by increasing or decreasing the frequency of the operating clock. At this time, the settings are different from that described above and are set to low gain, which is for decreasing the control strength (step S2016). Low gain in this case means decreasing the value of the operating frequency to a setting value low enough to slowly decrease the phase difference of the signals being compared. While the operating clock frequency is being controlled by the CPU 1103 (step S2024), the phase difference in clock units between the input TC signal and the jam sync TC signal for phase synchronization is compared (step S2017). This control is the same as that illustrated in FIG. 15B. However, the threshold for $\Delta c$ is less that the setting value described above, making the conditions stricter.

In this state, with the timer for synchronization processing given an upper limit in a similar manner to as described above, in a case where the counting timer reaches the upper limit, the CPU 1103 ends clock control (YES in step S2018). Then, the CPU 1103 executes synchronization in frame units. This processing is similar to the control described above and so is omitted (step S2019, step S2020, and step S2021). In this case, the CPU 1103 can execute synchronization in frame units and synchronization roughly within the clock number range can be achieved, resulting in the processing ending with a medium synchronization accuracy (step S2022).

Finally, even in a state with the $\Delta c$ threshold being strict, in a case where the upper limit of the timer for synchronization control has not been reached (YES in step S2023), the temporal variation of the input TC signal is small, and the quality of the input signal is considered good. This means that synchronization with good accuracy can be achieved.

The synchronization processing unit 1114 stops the counting of the timer for synchronization processing (step S2025) and executes synchronization in frame units in a similar manner to that described above (step S2026, step S2027, step S2028). In this case, the CPU 1103 can execute synchronization in frame units and align the jam sync TC signal within a range of a few clocks, resulting in the processing ending with a high synchronization accuracy (step S2029). The example described above has been an example of the control flow for confirming the quality of an input TC signal.

In the example described above, the synchronization state of the apparatus switches according to the accuracy of the input TC signal. In the description, the accuracy of the synchronize states have been categorized as low accuracy, medium accuracy, and high accuracy. Also, after synchronization, as described in the embodiment described above, the phase adjustment function can be used. Next, the link between synchronization accuracy and the phase adjustment function will be described in detail.

Figure 14B:
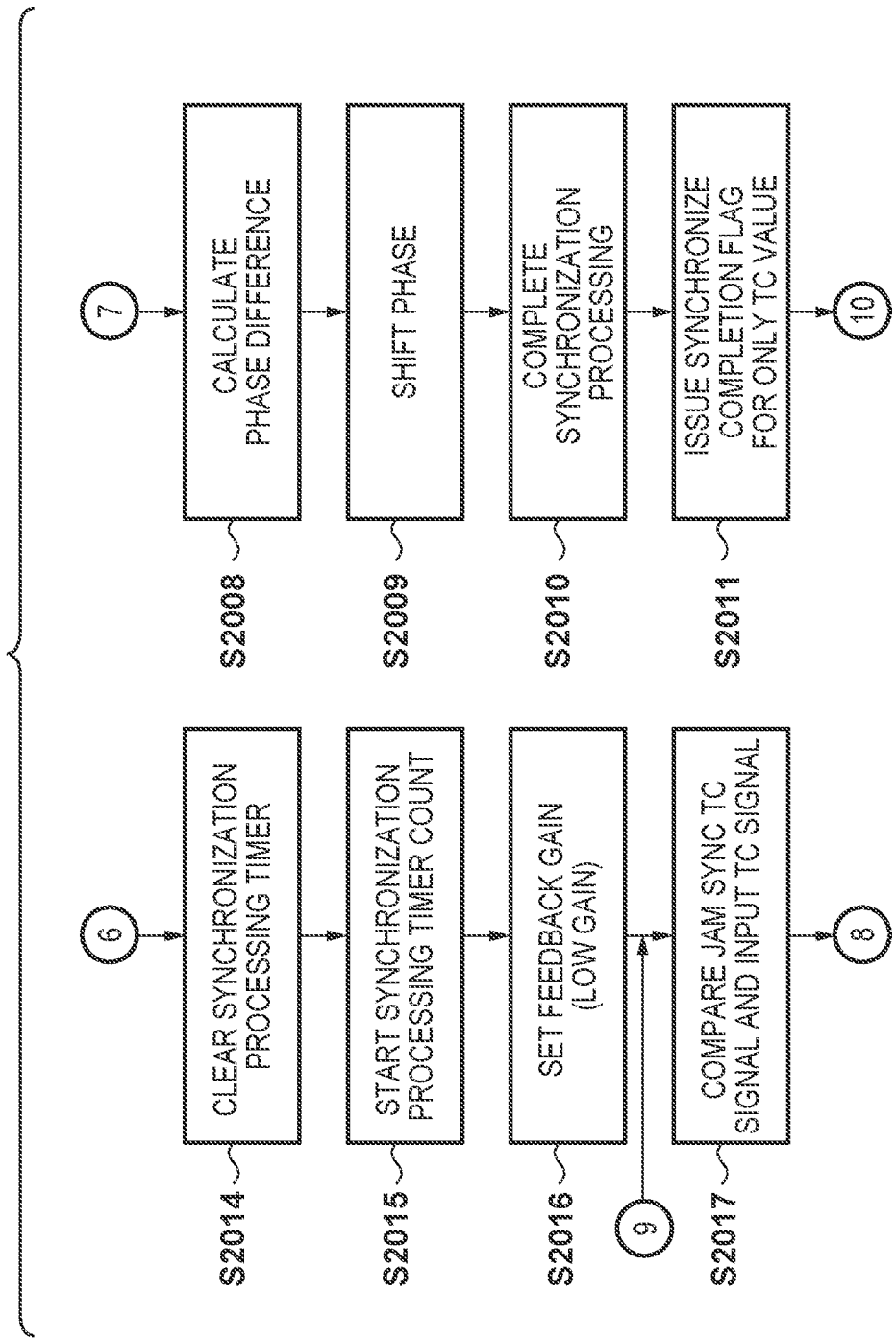
Figure 17A:
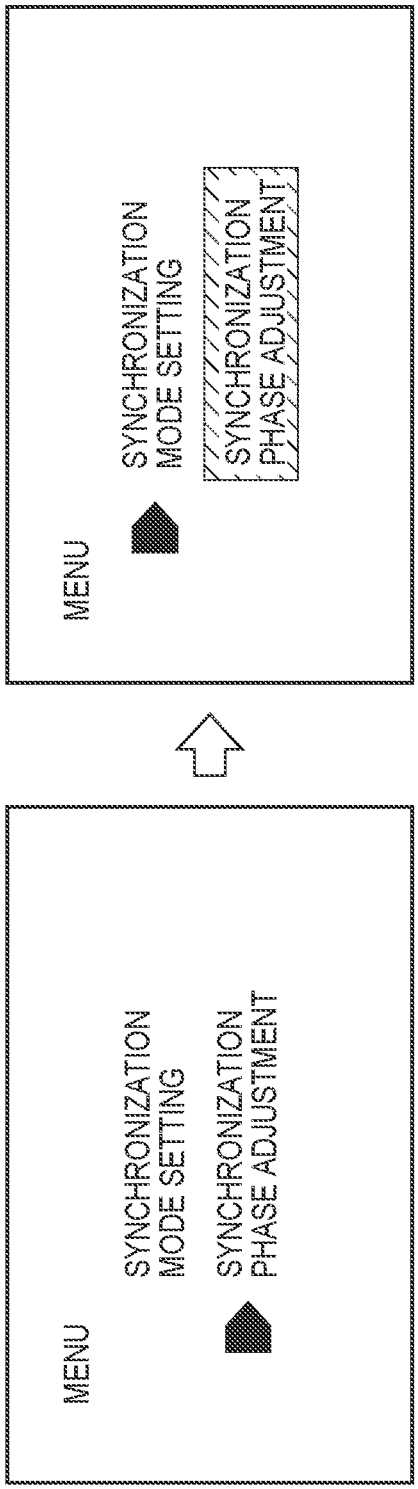
Figure 17B:
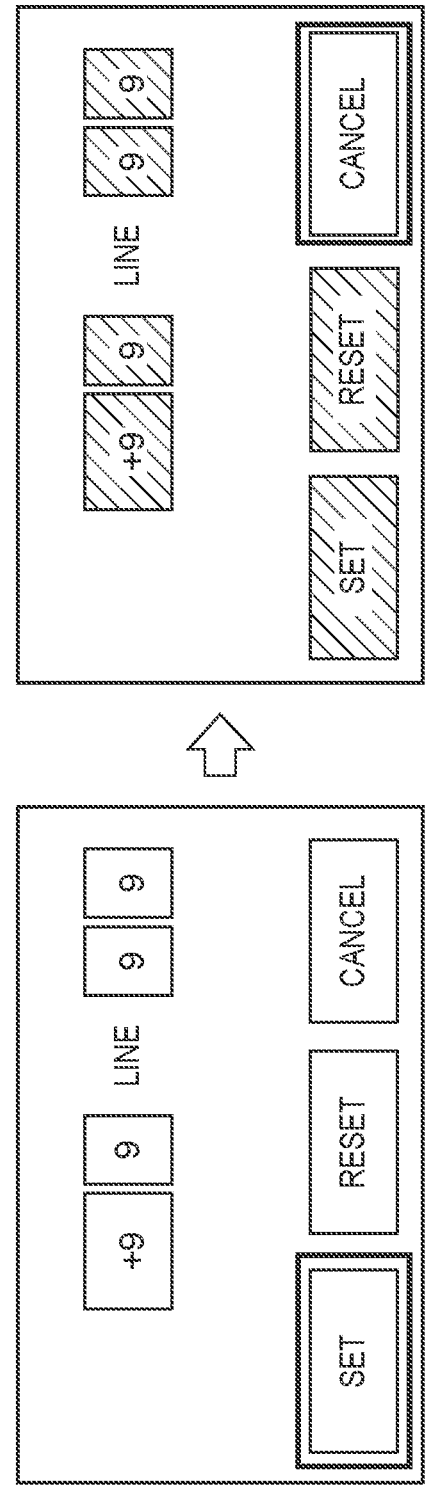

In a case of low accuracy, a completion flag is issued in step S2011 of FIG. 14B. The state is a synchronization state in frame units, but because the quality of the input TC signal does not satisfy the standards and the temporal variation is large, the state is not sufficient for synchronization processing. When this flag is issued, the CPU 1103 may control the display processing unit 1108 to output the display illustrated in FIG. 15A on the display unit 1109 to inform the user of this state. In other words, the image capturing apparatus 1100 is controlled so that the phase adjustment function is not used. For example, the phase adjustment function item may be unable to be selected from the menu screen as illustrated in FIG. 17A, the values for phase adjustment may be unable to be entered on the phase adjustment menu screen 1800 of FIG. 12 as illustrated in FIG. 17B, and the like so that a phase adjustment instruction is unable to be accepted.

Figure 14C:
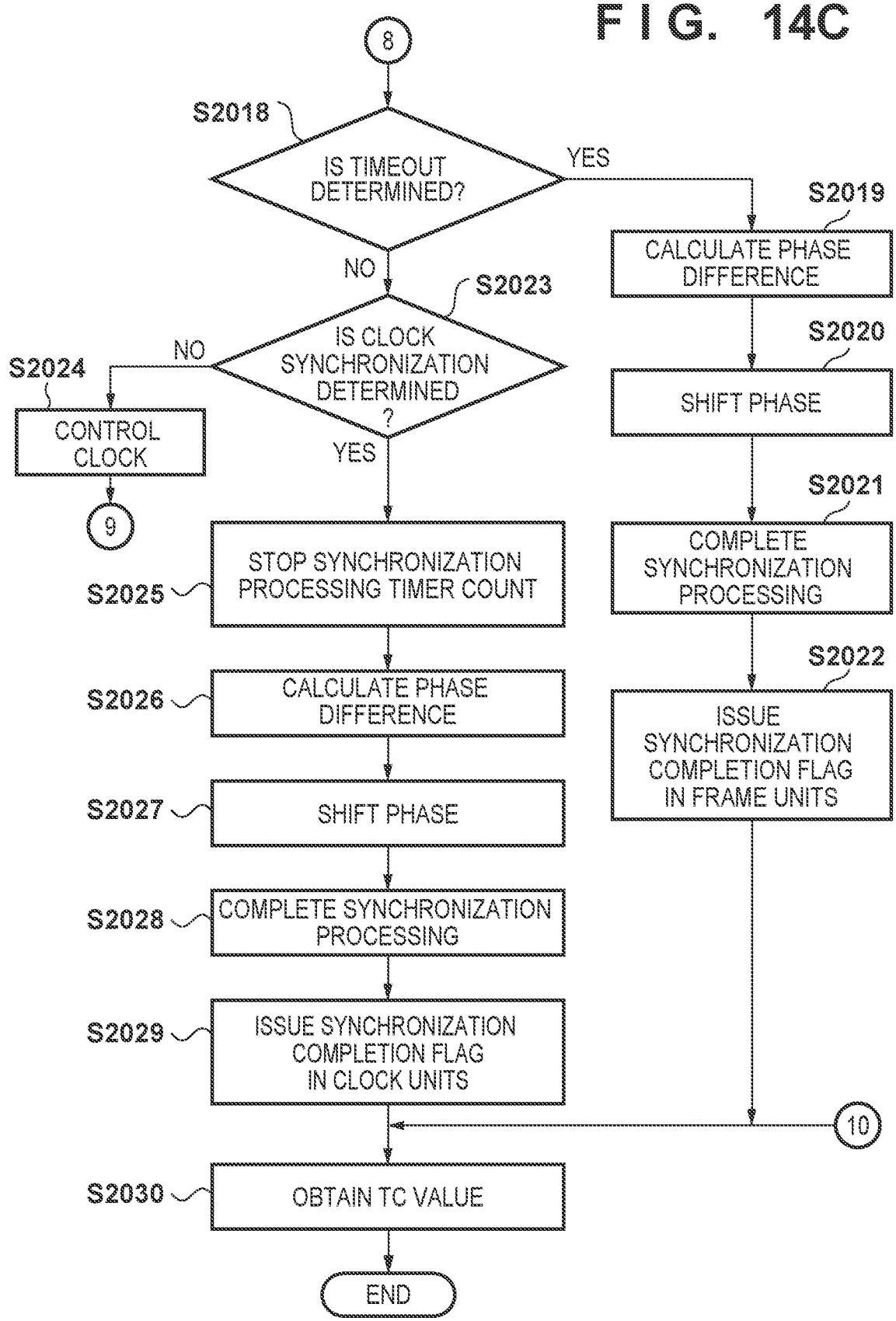

In a case of medium accuracy, a completion flag is issued in step S2022 of FIG. 14C. The state is a synchronized state in frame units and, though wide, is a synchronized state in clock units within a range. When this flag is issued, the CPU 1103 may control the display processing unit 1108 to output the display illustrated in FIG. 16B on the display unit 1109 to inform the user of this state. In other words, the image capturing apparatus 1100 is controlled so that the phase adjustment function is able to be used with limitations. For example, on the phase adjustment menu screen 1800 of FIG. 12, values for a high resolution setting item of the phase adjustment menu illustrated in FIG. 17C may be unable to be entered and the like so that only an instruction for a rough phase adjustment is able to be accepted. Alternatively, as described above, a plurality of thresholds for Δc may be set, and the adjustment resolution may be changed depending thereon. For example, as illustrated in FIG. 17D, the resolution may be able to be improved more than in the example illustrated in FIG. 17C. As a supplement, though in FIG. 17C the unit line is used, this is to allow the 80 bit TC signal described above to be converted into video signal lines, and alternatively the adjustment resolution control may use bit units.

In a case of high accuracy, a completion flag is issued in step S2029 of FIG. 14C. The state is a synchronized state in frame units and is a state in which the input TC signal and the jam sync are synchronized within a few clocks. When this flag is issued, the CPU 1103 may control the display processing unit 1108 to output the display illustrated in FIG. 16C on the display unit 1109 to inform the user of this state. In other words, the image capturing apparatus 1100 is controlled so that the phase adjustment function can be used at maximum resolution. The example described above has been of the workings of the phase adjustment function corresponding to synchronization accuracy.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-039921, filed Mar. 9, 2020, and Japanese Patent Application No. 2020-039922, filed Mar. 9, 2020, which are hereby incorporated by reference herein in their entirety.

What is claimed is:

1. An image capturing apparatus including a terminal for input from an external device of a timecode signal synchronized with video frames, comprising:
   a first synchronizing unit configured to execute synchronization of an internal timecode of the image capturing apparatus, using a timecode superimposed on the timecode signal input into the terminal;
   a second synchronizing unit configured to execute Genlock for synchronizing sync signals of video generated by the image capturing apparatus with horizontal and vertical synchronizing phases of the timecode signal and execute synchronization of the internal timecode using the timecode superimposed on the timecode signal; and
   a control unit configured to execute synchronization processing by the first synchronizing unit or the second synchronizing unit in a case where a timecode signal input into the terminal is detected.

2. The apparatus according to claim 1, further comprising a third synchronizing unit configured to execute Genlock for synchronizing sync signals of video generated by the image capturing apparatus with horizontal and vertical synchronizing phases of a timecode signal;

wherein the control unit executes synchronization processing by the first synchronizing unit, the second synchronizing unit, or the third synchronizing unit in a case where a timecode signal input into the terminal is detected.

3. The apparatus according to claim 2, wherein the control unit selects the first synchronizing unit, the second synchronizing unit, or the third synchronizing unit according to an instruction from a user and executes synchronization processing according to the synchronizing unit selected.

4. The apparatus according to claim 2, wherein the control unit includes a display unit configured to display a menu for selection of the first synchronizing unit, the second synchronizing unit, or the third synchronizing unit.

5. The apparatus according to claim 3, wherein the control unit selects the first synchronizing unit, the second synchronizing unit, or the third synchronizing unit when triggered by detection of a timecode signal input into the terminal.

6. The apparatus according to claim 2, further comprising a first determination unit configured to determine whether or not there is an input of a timecode signal into the terminal; and a second determination unit configured to, in a case where the first determination unit determines that there is an input of a timecode signal into the terminal, determine whether or not a waveform of the timecode signal input into the terminal satisfies a criteria condition.

7. The apparatus according to claim 6, wherein the control unit transitions to jam sync mode in a case where the first determination unit determines that there is no input of a timecode signal.

8. The apparatus according to claim 6, wherein, in a case where the second determination unit determines that the waveform of the timecode signal satisfies the criteria condition, and the second synchronizing unit or the third synchronizing unit executes processing to bring a phase difference between a horizontal synchronizing signal generated by the image capturing apparatus and a horizontal synchronizing signal obtained from the timecode signal within a predetermined value range, and then execute processing to bring a phase difference between a vertical synchronizing signal generated by the image capturing apparatus and a vertical synchronizing signal obtained from the timecode signal within a predetermined value range.

9. The apparatus according to claim 6, further comprising a third determination unit configured to determine whether or not a state where the waveform of the timecode signal does not satisfy the criteria condition according to the second determination unit has continued for a predetermined amount of time.

10. The apparatus according to claim 9, wherein the second synchronizing unit executes processing for bringing a phase difference between a vertical synchronizing signal obtained from the waveform of the timecode signal and a vertical synchronizing signal generated by the image capturing apparatus within a predetermined value range until the predetermined amount of time elapses according to the third determination unit and executes synchronization processing using the timecode superimposed on the timecode signal, and executes processing to display an error state in a case where the third determination unit determines that the predetermined amount of time has elapsed.

11. The apparatus according to claim 1, wherein the control unit does not execute synchronization with the timecode superimposed on the timecode signal input into the terminal in a case of determining a start timecode for when adding a timecode to a video frame on the basis of a timecode of a final frame of recorded video data or in a case of advancing the timecode only when recording video data.

12. The apparatus according to claim 1, wherein, even in a case where a user has selected synchronization processing by the first synchronizing unit or the second synchronizing unit, the control unit does not execute synchronization with the timecode superimposed on the timecode signal input into the terminal in a case of determining a start timecode for when adding a timecode to a video frame on the basis of a timecode of a final frame of recorded video data or in a case of advancing the timecode only when recording video data.

13. The apparatus according to claim 1, wherein the control unit executes control to not allow a user to select synchronization processing by the first synchronizing unit or the second synchronizing unit in a case of determining a start timecode for when adding a timecode to a video frame on the basis of a timecode of a final frame of recorded video data or in a case of advancing the timecode only when recording video data.

14. The apparatus according to claim 4, wherein the display unit further displays an identifiable icon indicating a state of whether or not synchronization with the timecode is being executed and whether or not synchronization with a horizontal synchronizing phase or a vertical synchronizing phase of the timecode signal is being executed.

15. The apparatus according to claim 14, wherein the display unit controls a display state of the icon using lighting up/flashing, size, and/or color.

16. The apparatus according to claim 1, further comprising an image capturing unit and a recording unit configured to record video data obtained by the image capturing unit on a recording medium.

17. A method of controlling an image capturing apparatus including a terminal for input from an external device of a timecode signal synchronized with video frames, comprising:

(a) executing synchronization of an internal timecode of the image capturing apparatus, using a timecode superimposed on the timecode signal input into the terminal;

(b) executing Genlock for synchronizing sync signals of video generated by the image capturing apparatus with horizontal and vertical synchronizing phases of the timecode signal and executing synchronization of the internal timecode using the timecode superimposed on the timecode signal; and (c) executing synchronization processing by the synchronizing (a) or the synchronizing (b) in a case where a timecode signal input into the terminal is detected.

18. A non-transitory computer-readable storage medium storing a program which, when read and executed by a computer, causes the computer steps of a method of controlling an image capturing apparatus including a terminal for input from an external device of a timecode signal synchronized with video frames, the method comprising:

(a) executing synchronization of an internal timecode of the image capturing apparatus, using a timecode superimposed on the timecode signal input into the terminal;

(b) executing Genlock for synchronizing sync signals of video generated by the image capturing apparatus with horizontal and vertical synchronizing phases of the timecode signal and executing synchronization of the internal timecode using the timecode superimposed on the timecode signal; and (c) executing synchronization processing by the synchronizing (a) or the synchronizing (b) in a case where a timecode signal input into the terminal is detected.

* * * * *